United States Patent
Mimura

(10) Patent No.: US 8,698,742 B2
(45) Date of Patent: Apr. 15, 2014

(54) APPARATUS FOR DISPLAYING AN IMAGE AND SENSING AN OBJECT IMAGE, METHOD FOR CONTROLLING THE SAME, AND COMPUTER-READABLE STORAGE MEDIUM STORING THE PROGRAM FOR CONTROLLING THE SAME

(75) Inventor: Toshihiko Mimura, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 497 days.

(21) Appl. No.: 12/988,881

(22) PCT Filed: Mar. 8, 2010

(86) PCT No.: PCT/JP2010/001620
§ 371 (c)(1),
(2), (4) Date: Oct. 21, 2010

(87) PCT Pub. No.: WO2010/103791
PCT Pub. Date: Sep. 16, 2010

(65) Prior Publication Data
US 2011/0037692 A1      Feb. 17, 2011

(30) Foreign Application Priority Data

Mar. 9, 2009   (JP) .................................. 2009-055636

(51) Int. Cl.
*G06F 3/033*     (2013.01)
(52) U.S. Cl.
USPC .......................................... 345/157; 382/190
(58) Field of Classification Search
USPC .......................... 345/625, 634; 382/190–208
See application file for complete search history.

(56) References Cited

U.S. PATENT DOCUMENTS

| 7,986,851 B2 * | 7/2011 | Cooper ........................ 382/254 |
| 2002/0108108 A1 | 8/2002 | Akaiwa et al. |
| 2003/0052866 A1 | 3/2003 | Sakaguchi |
| 2004/0239763 A1 * | 12/2004 | Notea et al. .................... 348/169 |

(Continued)

FOREIGN PATENT DOCUMENTS

| CN | 1386213 A | 12/2002 |
| EP | 0464712 A2 | 1/1992 |

(Continued)

OTHER PUBLICATIONS

European Search Report for corresponding European Patent Application No. 10750548.9, dated Apr. 17, 2013.

*Primary Examiner* — Abbas Abdulselam
*Assistant Examiner* — Gerald Oliver
(74) *Attorney, Agent, or Firm* — Birch, Stewart, Kolasch & Birch, LLP

(57) ABSTRACT

The present invention includes: a display/optical sensor section (300) that displays an image and captures an object image located in the vicinity of the display/optical sensor section (300); a browser processing section (11) that causes a window including a placement area to be displayed on the display/optical sensor section (300), the placement area being an area for placing an object; an API processing section (12) that converts first area information into second area information, the first area information indicating the location of the placement area in the window, the second area information indicating the location of the placement area in the display/optical sensor section (300); and a driver processing section (15) that derives a captured image, the captured image being an image of the object located in the vicinity of the display/optical sensor section (300) and captured through an area defined by the second area information.

10 Claims, 17 Drawing Sheets

(56) References Cited

U.S. PATENT DOCUMENTS

| | | |
|---|---|---|
| 2005/0108353 A1 | 5/2005 | Yamamoto |
| 2006/0055965 A1 | 3/2006 | Nakamura et al. |
| 2008/0147912 A1 | 6/2008 | Akaiwa et al. |
| 2008/0150952 A1 | 6/2008 | Koarai |
| 2008/0234843 A1 | 9/2008 | Akaiwa et al. |
| 2009/0210491 A1* | 8/2009 | Thakkar et al. ............... 709/204 |
| 2010/0085380 A1* | 4/2010 | Tsuda ........................... 345/629 |
| 2010/0309210 A1 | 12/2010 | Akaiwa et al. |
| 2011/0210977 A1 | 9/2011 | Akaiwa et al. |

FOREIGN PATENT DOCUMENTS

| | | |
|---|---|---|
| JP | 4-195625 A | 7/1992 |
| JP | 2000-315118 A | 11/2000 |
| JP | 2002-132651 A | 5/2002 |
| JP | 2003-108310 A | 4/2003 |
| JP | 2003-122474 A | 4/2003 |
| JP | 2005-149320 A | 6/2005 |
| JP | 2006-140918 A | 6/2006 |
| JP | 2006-179977 A | 7/2006 |
| JP | 2006-184973 A | 7/2006 |

\* cited by examiner

FIG. 6

| No | FIELD NAME | VALUE | MEANING | SUPPLEMENTAL REMARKS |
|---|---|---|---|---|
| 1 | DATA OBTAINING TIMING | 00 | SENSE | REQUEST LATEST DATA |
| | | 01 | EVENT | REQUEST DATA CHANGED |
| | | 10 | ALL | REQUEST DATA AT PREDETERMINED INTERVALS |
| | | ... | ... | ... |
| 2 | DATA TYPE | 001 | COORDINATES | REQUEST TYPICAL COORDINATES OF THE PARTIAL IMAGE (COORDINATES OF ENTIRE IMAGE) |
| | | 010 | PARTIAL IMAGE | REQUEST PARTIAL IMAGE (IMAGE WITH CHANGES) AND TYPICAL COORDINATES OF THE PARTIAL IMAGE |
| | | 100 | ENTIRE IMAGE | REQUEST SCANNED WHOLE IMAGE |
| | | ... | ... | ... |
| 3 | SCANNING MODE | 00 | REFLECTION | PERFORM SCANNING WITH BACKLIGHT LIT UP |
| | | 01 | TRANSMISSION | PERFORM SCANNING WITH BACKLIGHT TURNED OUT |
| | | 10 | REFLECTION/ TRANSMISSION | USE BOTH REFLECTION AND TRANSMISSION |
| | | ... | ... | ... |
| 4 | SCANNED IMAGE GRAYSCALE LEVEL | 00 | BINARY | REQUEST MONOCHROME IMAGE DATA |
| | | 01 | MULTILEVEL | REQUEST MULTILEVEL GRAYSCALE DATA |
| | | ... | ... | ... |
| 5 | SCANNING RESOLUTION | 0 | HIGH | REQUEST DATA SCANNED WITH HIGH RESOLUTION (FOR IMAGE RECOGNITION OF FINGERPRINT, ETC.) |
| | | 1 | LOW | REQUEST DATA SCANNED WITH LOW RESOLUTION (FOR SHADOWS OF FINGER AND HAND, ETC.) |
| | | ... | ... | ... |
| 6 | SCANNING PANEL | 001 | FIRST DISPLAY/OPTICAL SENSOR SECTION | FIRST DISPLAY/OPTICAL SENSOR SECTION PERFORMS SCANNING |
| | | 010 | SECOND DISPLAY/OPTICAL SENSOR SECTION | SECOND DISPLAY/OPTICAL SENSOR SECTION PERFORMS SCANNING |
| | | ... | ... | ... |
| 7 | DISPLAY PANEL | 001 | FIRST DISPLAY/OPTICAL SENSOR SECTION | FIRST DISPLAY/OPTICAL SENSOR SECTION SHOWS DISPLAY DATA |
| | | 010 | SECOND DISPLAY/OPTICAL SENSOR SECTION | SECOND DISPLAY/OPTICAL SENSOR SECTION SHOWS DISPLAY DATA |
| | | ... | ... | ... |
| ... | ... | ... | ... | ... |

FIG. 12

```
<html>
 <title>WEB VERSION OF NAME CARD MANAGEMENT SYSTEM</title>
 <body>
  <h1>WEB VERSION OF NAME CARD MANAGEMENT SYSTEM</h1>
  <form action="http://meishi.jp/" method="POST">                    — FT
    <scan name="image" width="440" height="300" bgcolor="gray"/>     — ST
    <input type="SUBMIT" value="SEND">                               — IT
  </form>
  <p>HOLD A NAME CARD OVER THE GRAY-COLORED AERA, AND CLICK "SEND".</p>
 </body>
</html>
```

APPARATUS FOR DISPLAYING AN IMAGE AND SENSING AN OBJECT IMAGE, METHOD FOR CONTROLLING THE SAME, AND COMPUTER-READABLE STORAGE MEDIUM STORING THE PROGRAM FOR CONTROLLING THE SAME

TECHNICAL FIELD

The present invention relates to an apparatus for displaying an image and sensing an object image, the apparatus capable of concurrently carrying out display of an image and capture of an image of an object, a method for controlling the same, a program for controlling the same, and a computer-readable storage medium storing the program.

BACKGROUND ART

In recent years, the Internet has become popular. This has led to extensive use of a technique that uses a WWW (World Wide Web) browser or the like to allow a client device such as a PC (Personal Computer) to obtain (download) data from a server device and to transmit (upload) data to the server device. Thanks to this, a user can uses the WWW browser to obtain, e.g., a certain Web page from the server device, and can transmit, to the server device, a document image and/or the like captured by a scanner device or the like.

As an example of means to transmit data from the client device to the server device with use of the WWW browser, use of a Web page shown in FIG. 18 is considered. FIG. 18 shows an example of a WWW browser screen that displays a Web page for transmitting data to a server device. The description here deals with, as an example, a case where the data to be sent to the server device is data of an image of a name card captured by a scanner device or the like.

This Web page is described in a language such as HTML (HyperText Markup Language) so that an image specified in a text box is transmitted to the server device in response to a push of a "SEND" button shown in FIG. 18.

That is, a user can use this Web page in the following manner: (1) First, the user causes a scanner device or the like to read a name card, so that an image of the name card is generated. (2) Thereafter, the user specifies the generated image on the Web page, and then pushes the "SEND" button. By carrying out this operation, the user can send the image of the name card to the server device.

Incidentally, there have been conventionally known client devices each having a scanning capability. Among these, in particular, there is a display/capturing device capable of carrying out, in a single screen, display of an image and capture of an image of a document and/or the like. Specifically, this display/capturing device is configured such that (i) a plurality of light-emitting elements for image display and (ii) a plurality of light-receiving elements for capturing an image of a document, etc. placed on a display screen are arranged in a single screen. Installing a WWW browser in this display/capturing device allows a user to carry out, in a single screen, (i) operation for capturing a document, etc. and (ii) operation for transmitting a document image, etc. with use of the WWW browser. However, even in this case, the user must individually carry out (i) the operation for capturing an image of the document, etc. and (ii) the operation for transmitting the image, in order to transmit the image of the name card to the server device.

Other examples of the technique for transmitting data from the client device to the server device with use of the so-called web techniques encompass not only the example described above but also techniques disclosed in Patent Literatures 1 and 2.

Patent Literature 1 discloses a technique for uploading data held by a PC or a personal digital assistant to a facsimile device on the basis of an HTML file and a CGI (Common Gateway Interface) program. Patent Literature 2 discloses an image processing device that displays a predetermined button on a display section in accordance with an HTML document obtained from a server device, and, in response to a push of the button, transmits to the server device a document image scanned by a scanner device.

CITATION LIST

Patent Literature

[Patent Literature 1]
Japanese Patent Application Publication, Tokukai, No. 2002-132651 A (Publication Date: May 10, 2002)
[Patent Literature 2]
Japanese Patent Application Publication, Tokukai, No. 2005-149320 A (Publication Date: Jun. 9, 2005)

SUMMARY OF INVENTION

Technical Problem

As described above, in the case where the Web page explained with reference to FIG. 18 is used to transmit, to the server device, an image of a document and/or the like scanned by the scanner device or the above-described display/capturing device, the user must carry out individually (i) the operation for capturing an image of the document, etc. and (ii) the operation for transmitting the document image with use of the WWW browser.

Further, although the above-described display/capturing device has the function of capturing an image of a document and/or the like with its capture surface, this function does not closely cooperate with the so-called web techniques. Therefore, it is not easy for the server device to provide a Web page (SaaS (Software as a Service) application) for causing the capture surface to capture of an image of a document and/or the like.

One possible measure for solving these problems is as follows: A display/capturing device where a single surface serves both as a display surface and a capture surface is made capable of capturing an image of a document and/or the like placed on a WWW browser that shows a Web page provided by a server device, and a captured image is transmitted from the WWW browser to the server device. However, such a technique is not disclosed in Patent Literature 1 or 2.

The present invention was made in view of the above problems, and an object of the present invention is to provide: an apparatus for displaying an image and sensing an object image where a single surface serves both as a display surface and a capture surface, that displays a placement area which is not shown at a fixed position, and that is capable of capturing an image of an object placed on the placement area; a method for controlling the same; a program for controlling the same; and a computer-readable storage medium storing the program.

Solution to Problem

In order to solve the foregoing problems, an apparatus for displaying an image and sensing an object image according to the present invention is an apparatus for displaying an image and sensing an object image, the apparatus comprising a panel component that displays an image and captures an object image located in the vicinity of the panel component, the apparatus further comprising: window display control means that causes a window including a placement area to be displayed on the panel component, the placement area being an area for placing an object; coordinates converting means that converts first area information into second area information, the first area information indicating the location of the placement area in the window, the second area information indicating the location of the placement area in the panel component; and image deriving means that derives a capture image, the captured image being an image of the object located in the vicinity of the panel component and captured through an area defined by the second area information.

Further, a method for controlling an apparatus for displaying an image and sensing an object image, according to the present invention, is a method for controlling an apparatus for displaying an image and sensing an object image, the apparatus comprising a panel component that displays an image and captures an object image located in the vicinity of the panel component, the method comprising: a window display control step of causing a window including a placement area to be displayed on the panel component, the placement area being an area for placing an object; a coordinates converting step of converting first area information into second area information, the first area information indicating the location of the placement area in the window, the second area information indicating the location of the placement area in the panel component; and an image deriving step of deriving a captured image, the captured image being an image of the object located in the vicinity of the panel component and captured through an area defined by the second area information.

According to the above arrangement, it is possible to cause the window including the placement area to be displayed on the panel component, the placement area being an area for placing an object. Further, it is possible to convert first area information into second area information, the first area information indicating the location of the placement area in the window, the second area information indicating the location of the placement area in the panel component. Still further, it is possible to obtain a captured image, the captured image being an image of the object located in the vicinity of the panel component and captured through an area defined by the second area information.

This makes it possible to obtain the second area information from the first area information. Therefore, wherever the window is displayed on the display surface, and wherever the placement area is placed in the window, it is possible to determine the position of the placement area in the panel component.

This yields the effect of causing the panel component to reliably capture the image of the object placed on the placement area in the window. That is, this yields the effect of causing the panel component to reliably capture the image of the object placed on the placement area, which is not shown at a fixed position in the panel component.

Additional objects, features, and strengths of the present invention will be made clear by the description below. Further, the advantages of the present invention will be evident from the following explanation in reference to the drawings.

BRIEF DESCRIPTION OF DRAWINGS

FIG. 1 is a block diagram showing detailed configuration of a data display/sensor apparatus according to one embodiment of the present invention.

FIG. 2 is a view schematically showing a cross-section of a sensor-equipped liquid crystal panel included in the data display/sensor apparatus according to the embodiment of the present invention.

FIG. 3 is a view schematically showing a state in which detection of an image of an object is performed by sensing of a reflected image by the sensor-equipped liquid crystal panel included in the data display/sensor apparatus according to the embodiment of the present invention.

FIG. 4 is a block diagram showing the essential components of the data display/sensor apparatus according to the embodiment of the present invention.

FIG. 5 is a schematic diagram showing an exemplary frame structure of the command used in the data display/sensor apparatus according to the embodiment of the present invention.

FIG. 6

FIG. 6 is an explanatory view showing exemplary values that can be assigned to each of the fields contained in the command shown in FIG. 5, and showing an overview of the values.

Figure 7:
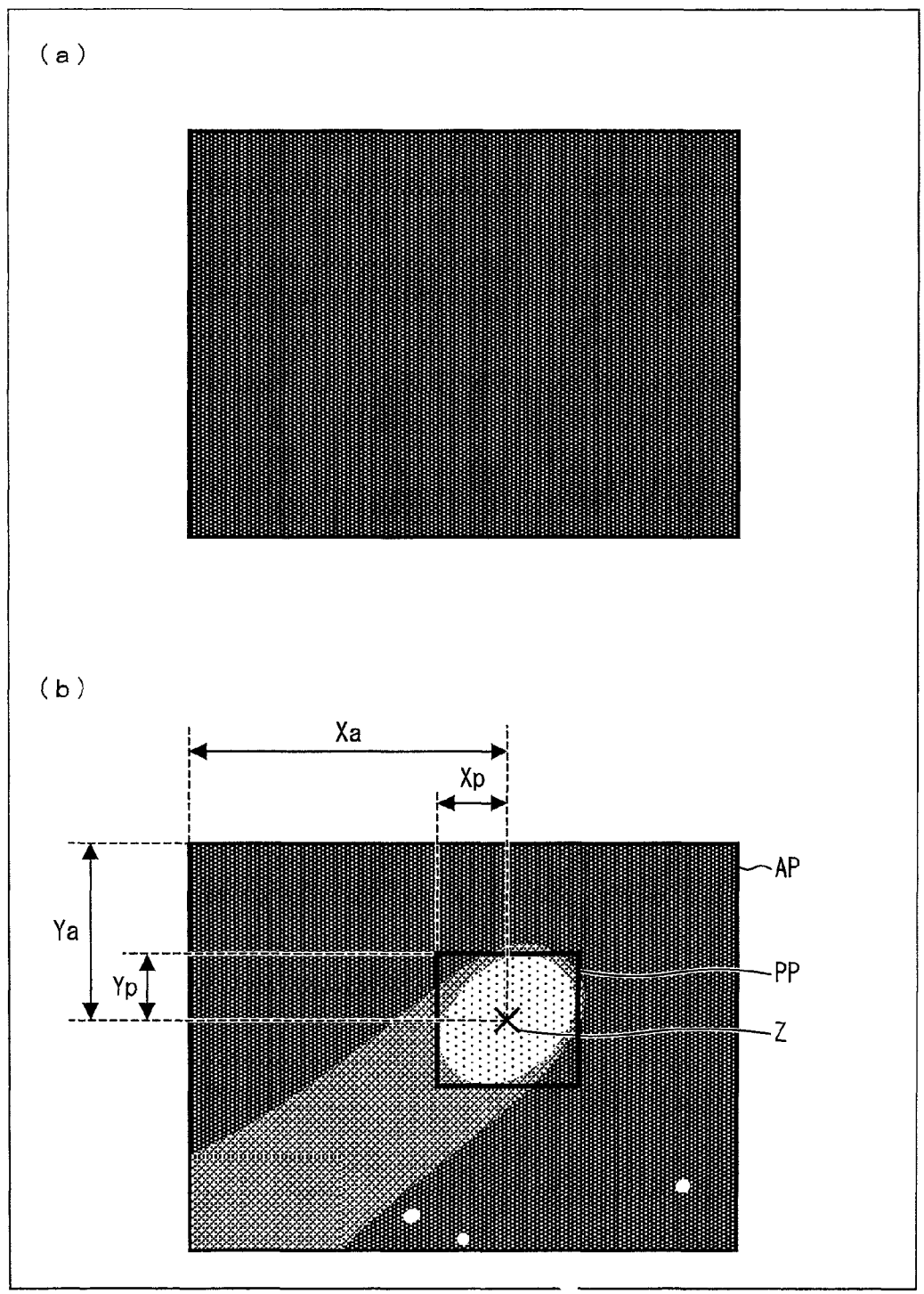
FIG. 7

(a) of FIG. 7 is image data obtained as a result of scanning of the entire sensor-equipped liquid crystal panel when an object is not placed on the sensor-equipped liquid crystal panel in the data display/sensor apparatus according to the embodiment of the present invention. (b) of FIG. 7 is image data obtained as a result of scanning of the entire sensor-equipped liquid crystal panel when the user is touching the sensor-equipped liquid crystal panel with his/her finger, in the data display/sensor apparatus according to the embodiment of the present invention.

FIG. 8

Figure 8:
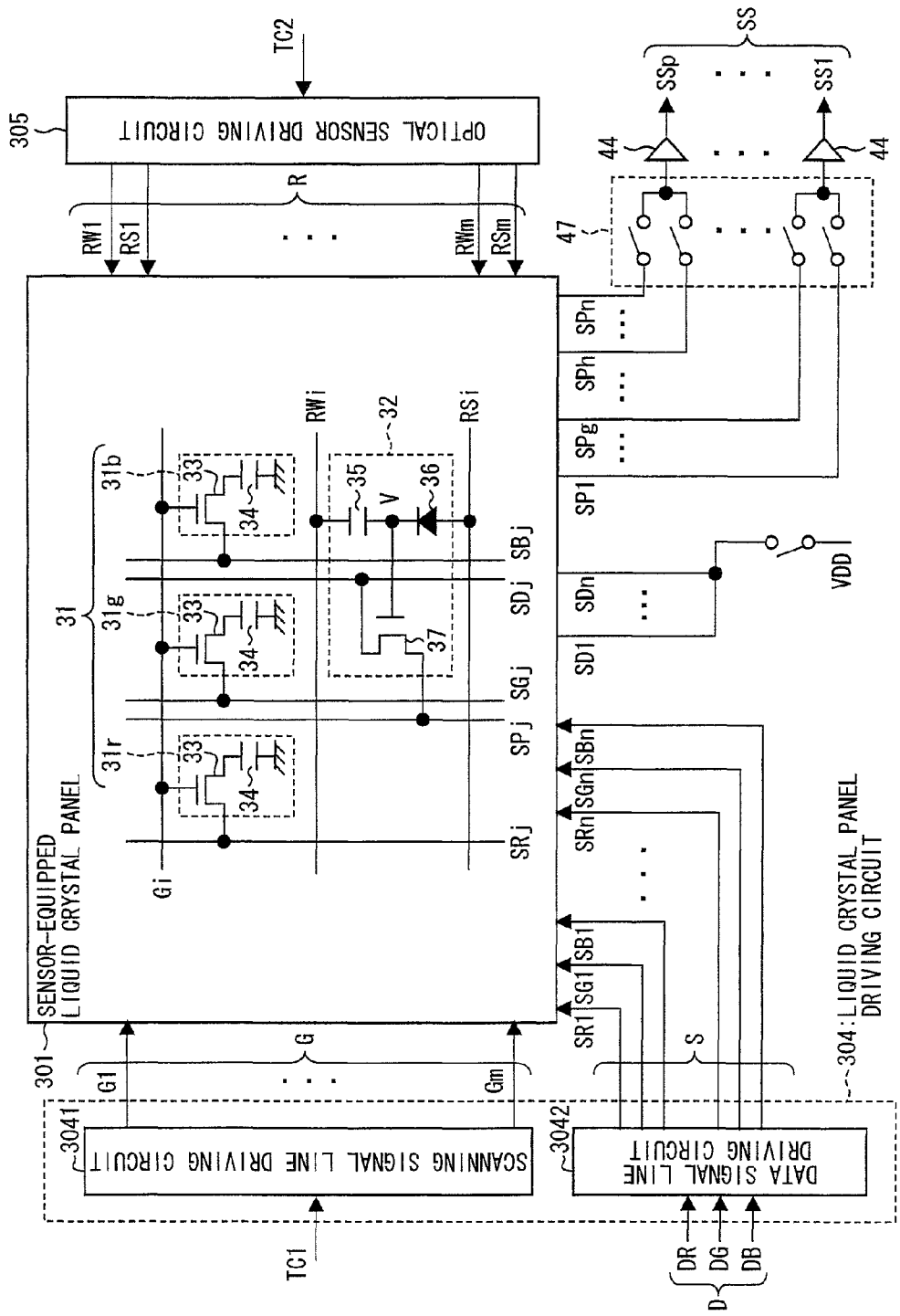

FIG. 8 is a block diagram showing the structure of the sensor-equipped liquid crystal panel and the structure of the peripheral circuit, both of which are included in the data display/sensor apparatus according to the embodiment of the present invention.

FIG. 9

Figure 9:
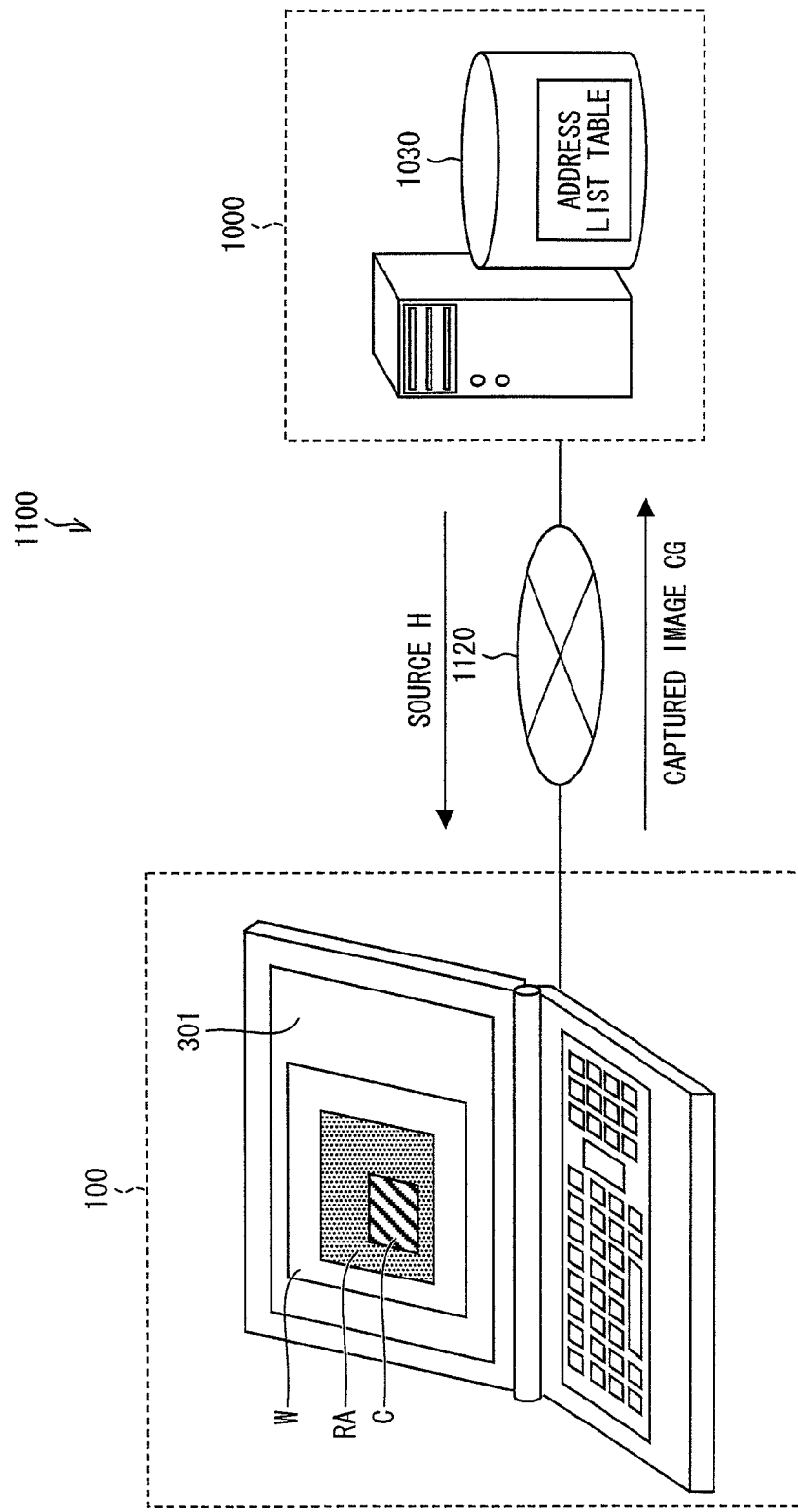

FIG. 9 is a view schematically showing the configuration of a system that includes the data display/sensor apparatus according to the embodiment of the present invention.

FIG. 10

Figure 10:
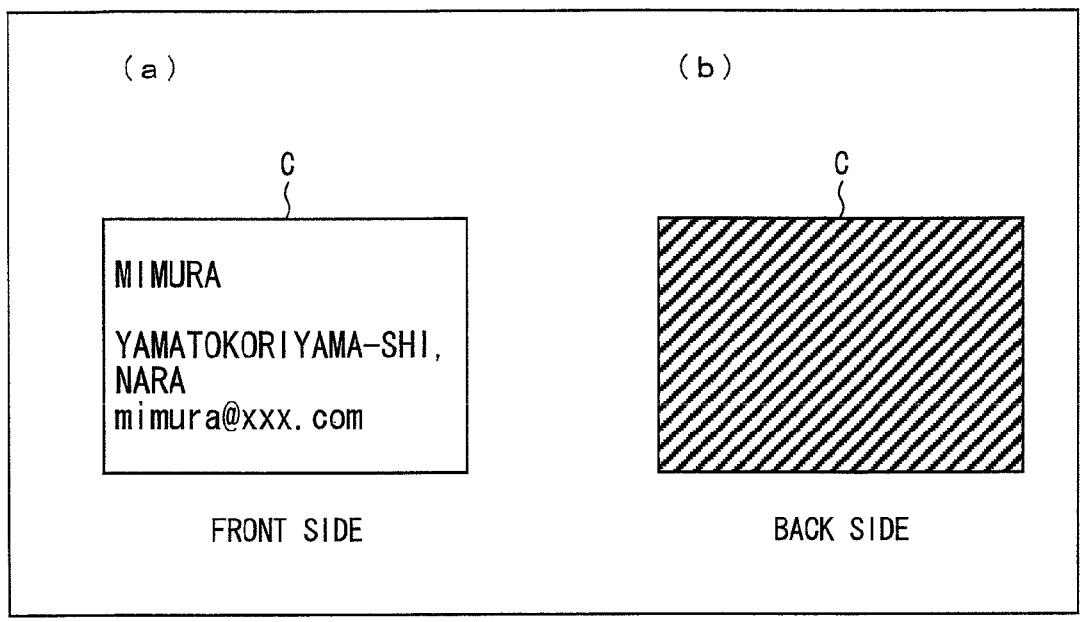

(a) of FIG. 10 is an explanatory view showing a front side of a name card C, which is an object, and (b) of FIG. 10 is an explanatory view showing a backside of the name card, which is the object.

FIG. 11

Figure 11:
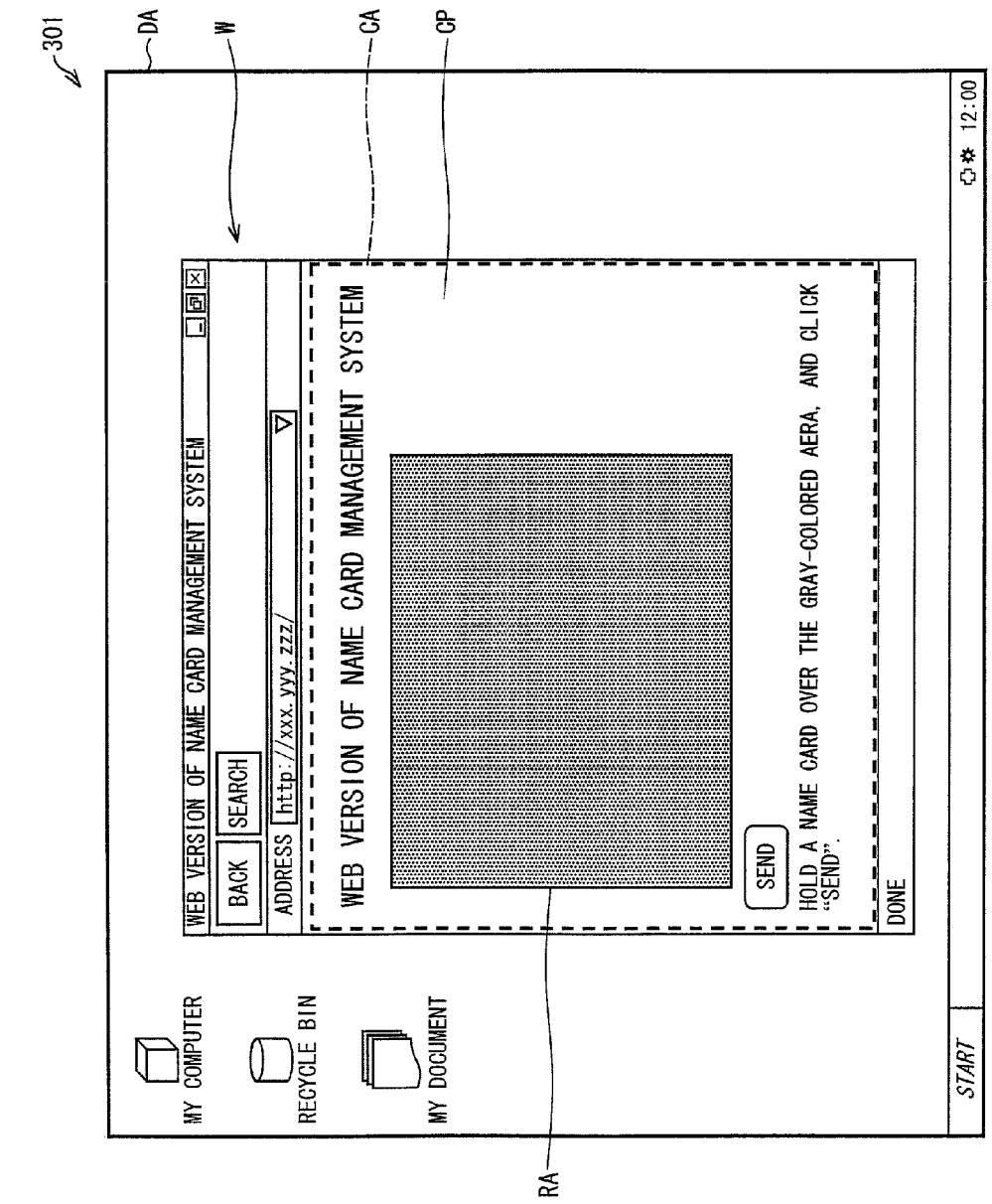

FIG. 11 is a view schematically showing the following state: On a desktop area (i.e., an entire display surface of the sensor-equipped liquid crystal panel included in the data display/sensor apparatus according to the embodiment of the present invention), a desktop screen of an OS program and a browser (i.e., an application program) are shown so as to overlap each other; and on a client area of the browser, a capturing page is shown in accordance with a source H obtained from an external server.

FIG. 12

FIG. 12 is a view schematically showing an example of the description of the source H processed by the data display/sensor apparatus according to the embodiment of the present invention.

FIG. 13

Figure 13:
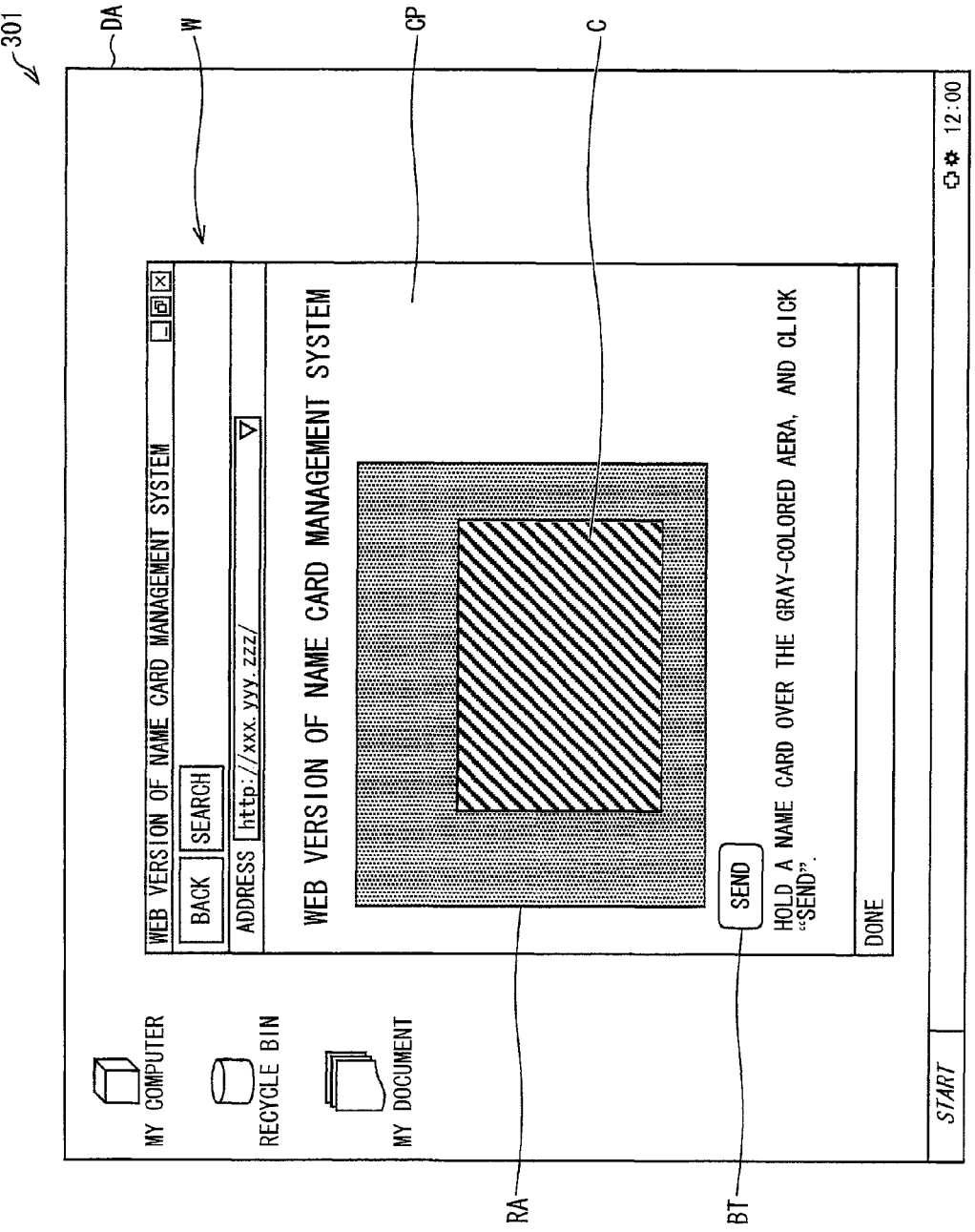

FIG. 13 is a view schematically showing a state where a user places, in the state of FIG. 11, the name card on the capturing area.

FIG. 14

Figure 14:
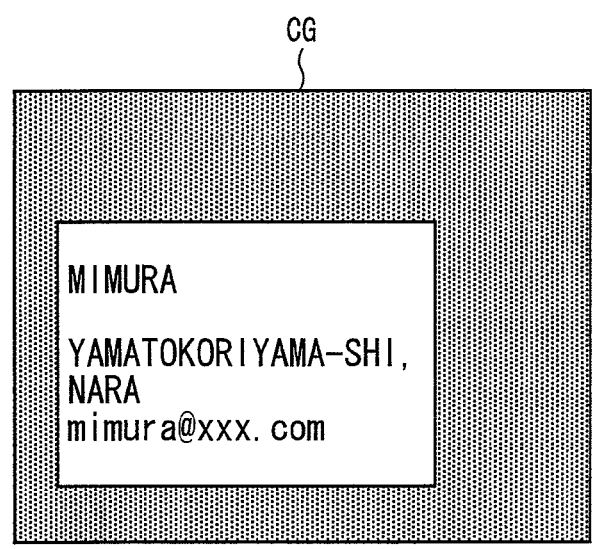

FIG. 14 is a view schematically showing an image generated, as a result of capture of the image of the front side of the name card placed on the capturing area by the sensor-equipped liquid crystal panel included in the data display/sensor apparatus according to the embodiment of the present invention.

FIG. 15

Figure 15:
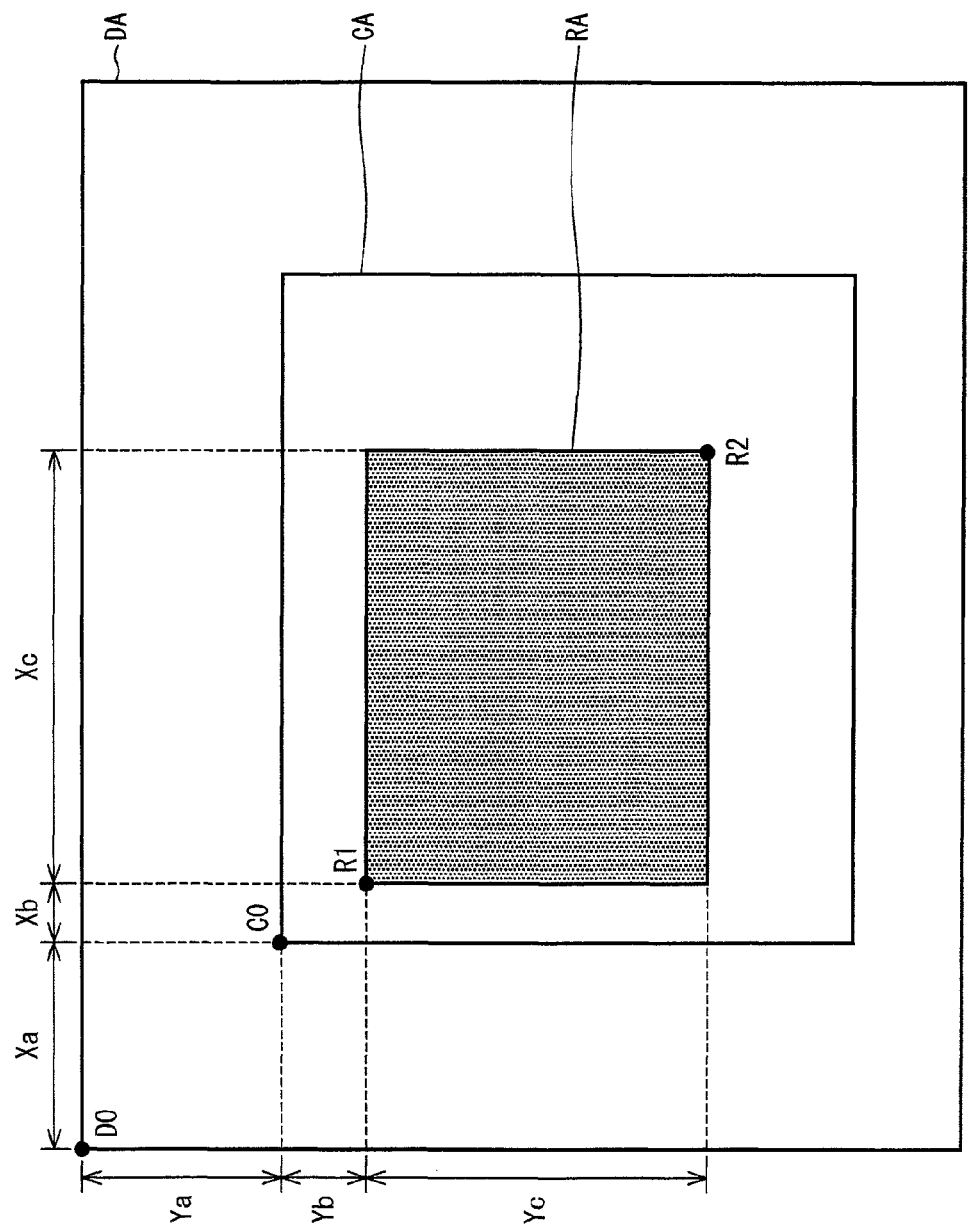

FIG. 15 is a view schematically showing a positional relationship between the desktop area, the client area, and the capturing area.

FIG. 16

Figure 16:
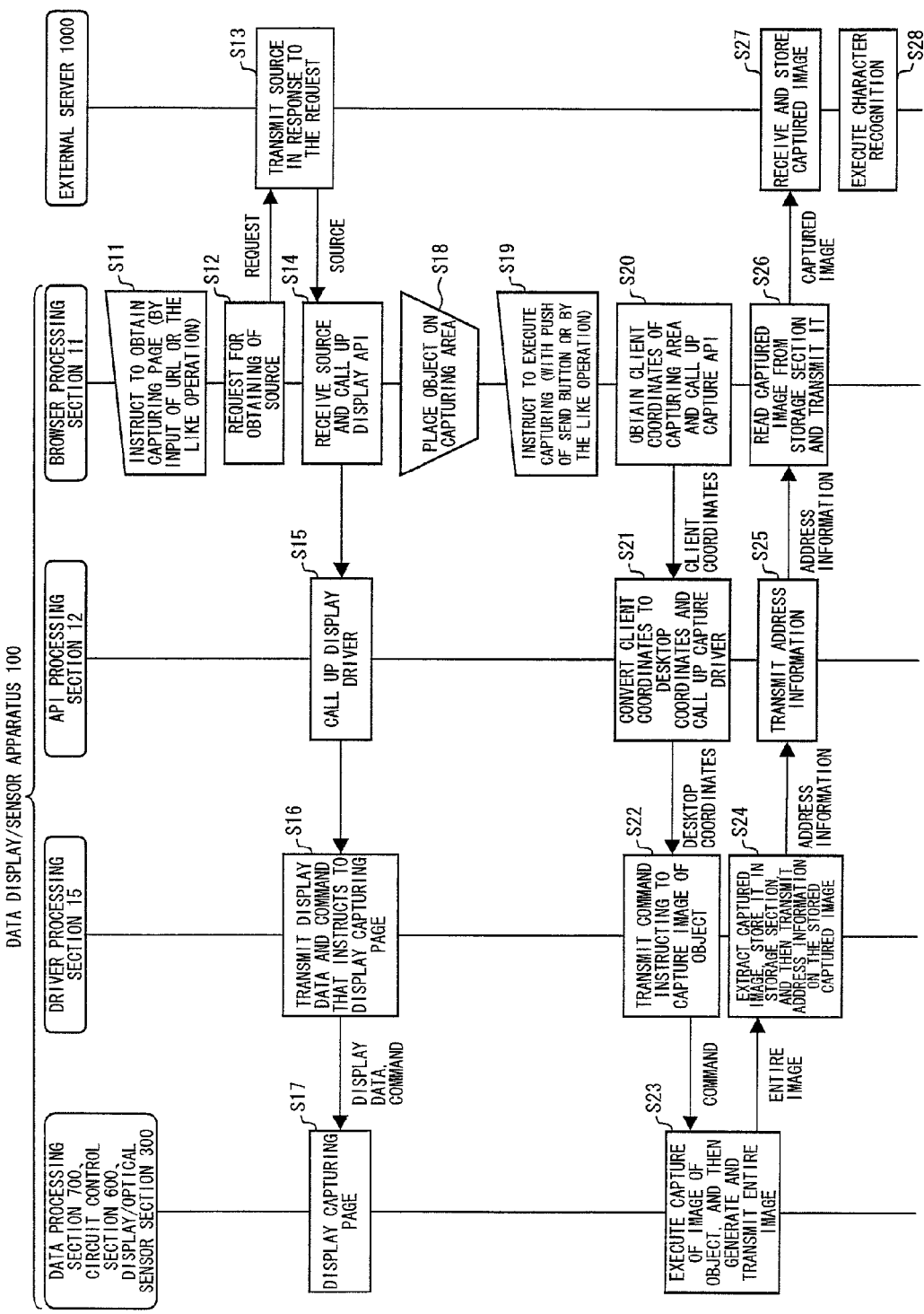

FIG. 16 is a flowchart showing a flow in which the data display/sensor apparatus according to the embodiment of the present invention performs capture of an image of the object placed on the place where the capturing area is shown, and the external server subjects the captured image to character recognition.

FIG. 17

Figure 17:
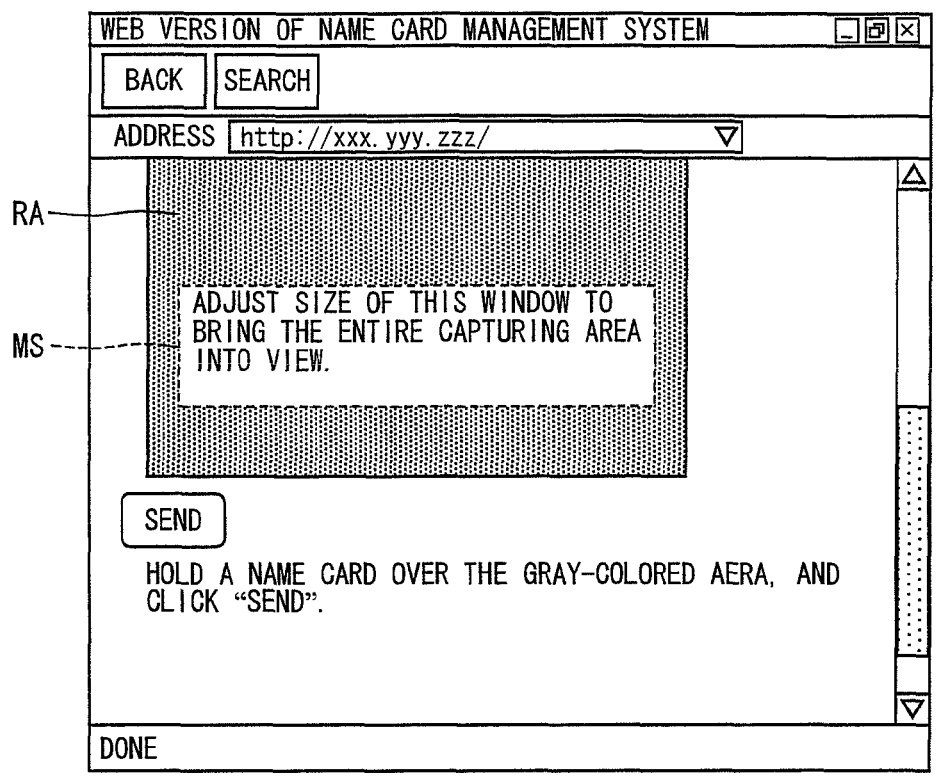

FIG. 17 is a diagram showing an exemplary message given when a part of the capturing area is hidden and not shown in the data display/sensor apparatus according to the embodiment of the present invention.

FIG. 18

Figure 18:
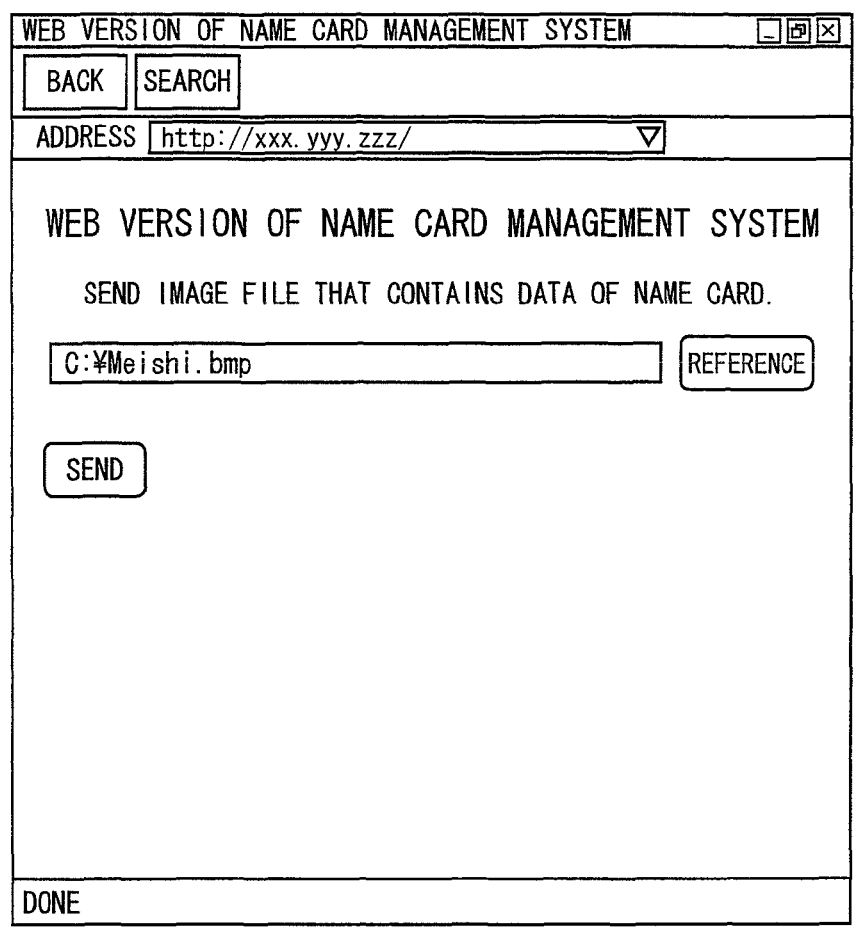

FIG. 18 is a view showing an exemplary screen of the WWW browser that shows a Web page for transmitting data to the server device.

DESCRIPTION OF EMBODIMENTS

The following will describe an embodiment of the present invention with reference to FIGS. 1 through 17.

Schematically speaking, a data display/sensor apparatus (apparatus for displaying an image and sensing an object image) 100 of the present embodiment includes a sensor-equipped liquid crystal panel (planer member) 301 (described later) capable of (i) displaying data of an image or the like and (ii) sensing an object image located in the vicinity of the sensor-equipped liquid crystal panel 301. Further, the data display/sensor apparatus 100 is capable of capturing an image of an object located in the vicinity of the sensor-equipped liquid crystal panel 301 while the sensor-equipped liquid crystal panel 301 displays an image (See FIG. 4).

Note that the object refers to a physical object which can be an object whose image is to be captured by the sensor-equipped liquid crystal panel 301. More specifically, the object can be a text document including characters and/or a picture(s), examples of which encompass books, cards, leaflets, and various materials. In particular, the object assumed herein is a name card C on which a name, an address, an e-mail address, and/or the like information are written. Note that "capturing" of an image of the object is also expressed as "scanning" herein.

(Schematic Configurations of Devices)

The following will schematically describe, with reference to FIG. 9, a configuration of a system 1100 including the data display/sensor apparatus 100 of the present embodiment and an external server (first external device, second external device) 1000. FIG. 9 is a view schematically showing the configuration of the system 1100. Assume that the data display/sensor apparatus 100 and the external server 1000 are connected to each other via a generally-known communication network 1120, and that the data display/sensor apparatus 100 and the external server 1000 can communicate with each other through use of a generally-known communication protocol such as HTTP (HyperText Transfer Protocol).

The data display/sensor apparatus 100 is a client terminal (e.g., a PC) provided with a function of requesting the external server 1000 for a source code (hereinafter, referred to as "source H") of a Web page described in HTML. Further, the data display/sensor apparatus 100 displays, in accordance with the source H obtained from the external server 1000, the Web page through use of a WWW browser (window).

Note that the WWW browser is hereinafter referred to as "browser W". The browser W is displayed on the sensor-equipped liquid crystal panel 301 by an OS (operating system) program of the data display/sensor apparatus 100. Note also that the position and size of the browser W shown can be changed by user's operation or the like operation, and are not fixed to specific ones.

Here, assume that the source H is described so as to display on a Web page (content) an area (hereinafter, referred to as "capturing area RA") that is (1) an area (placement area) indicating a range where an object is to be placed and (2) an area indicating a range corresponding to an image which is extracted as a captured result from an image (later-described captured image CG) captured by an entire capture surface of the sensor-equipped liquid crystal panel 301. Further, the source H is also described such that, in response to a user's instructions, the source H instructs the capture surface of the sensor-equipped liquid crystal panel 301 to capture an image of an object located in the vicinity thereof, and transmits the captured image CG to the external server 1000. Note that these descriptions are represented by tags such as a scan tag ST, which will be described later.

Therefore, in accordance with the source H obtained from the external server 1000, the data display/sensor apparatus 100 displays the Web page where the capturing area RA is shown. Further, the data display/sensor apparatus 100 derives a captured image CG from an image captured by the entire capture surface of the sensor-equipped liquid crystal panel 301, a part corresponding to the capturing area RA. Then, the data display/sensor apparatus 100 transmits the extracted captured image CG to the external server 1000 via the browser W (more specifically, by using an HTML POST method). Note that, the Web page where the capturing area RA is shown is hereinafter referred to as "capturing page CP".

Meanwhile, the external server 1000 is a server device provided with the function of offering, in response to a request from the data display/sensor apparatus 100, the source H to the data display/sensor apparatus 100. Further, the external server 1000 includes a storage section 1030 that stores various data. Examples of the various data encompass the source H to be offered to the data display/sensor apparatus 100 and the captured image CG sent from the data display/sensor apparatus 100.

In the external server 1000, an application program is executed which carries out a predetermined process on the captured image CG sent from the data display/sensor apparatus 100. As described above, in the present embodiment, the object is assumed to be the name card C, and therefore the application program is particularly assumed to recognize characters of a name, an address, an e-mail address, and/or the like information, and to carry out a process for registering data of the recognized characters in a table which is stored as an address list in the storage section 1030. This application program is hereinafter referred to as "character recognition application".

In the case where the character recognition application is executed in the external server 1000, the system 1100 is also referred to as "name card management system", for example.

(How an Image of the Object is Captured by using the Data Display/Sensor Apparatus)

The following will describe, with reference to FIGS. 10 through 14, a typical example of processes, carried out by the data display/sensor apparatus 100, for causing the sensor-equipped liquid crystal panel 301 to capture an image of an object that is placed on the capturing area RA shown in the capturing page CP. Note that the description here deals with an overview of the processes, and details of the processes will be described later.

First, with reference to FIG. 10, characters displayed on the name card C, which is the object, will be specifically described. (a) of FIG. 10 is a view showing a front side of the name card C. As shown in (a) of FIG. 10, the front side of the name card C includes (i) the characters "MIMURA", which represent a surname, (ii) the characters "YAMATOKO-RIYAMA-SHI, NARA", which represent an address, and (iii) the characters "mimura@xxx.com", which represent an e-mail address. (b) of FIG. 10 is a view showing a back side of the name card C.

Next, FIG. 11 is a view schematically showing the following state: On a desktop area DA (i.e., an entire display surface of the sensor-equipped liquid crystal panel 301), a desktop screen of the OS program and the browser W (i.e., an application program) are shown so as to overlap each other, and on a client area CA (described later) of the browser W, the capturing page CP is shown in accordance with the source H obtained from the external server 1000. As shown in FIG. 11, the capturing area RA is shown in the capturing page CP. In FIG. 11, the capturing area RA is gray-colored.

Note that the client area CA refers to a part where content such as a Web page is shown in a window region of the browser W (i.e., a part not including a title bar, a status bar, and the like). In FIG. 11, the client area CA is an area surrounded by broken lines.

Next, the following will describe an example of the description of the source H to be processed by the data display/sensor apparatus 100. FIG. 12 is a view schematically showing an example of the description of the source H. In particular, as illustrated in FIG. 12, the source H includes a form tag FT, a scan tag ST, and an input tag IT.

The form tag FT describes, as an action, carrying out a process of transmitting by the POST method on an URL (Uniform Resource Locator) specified as "http://meishi.jp". Note that the URL specified as "http://meishi.jp" is assumed to be an URL on the external server 1000. Note also that data to be sent by the POST method is a captured image CG, which will be described later.

The scan tag ST describes the capturing area RA. In the example shown in FIG. 12, the scan tag ST describes that the capturing area RA has a width (indicated as "width") of "440", a height (indicated as "height") of "300", and a color (indicated as "bgcolor") of "gray".

Note that the scan tag ST is a tag that is not defined by the HTML standards. As such, assume that the example here uses an HTML that is extended from the standards and that uniquely defines the scan tag ST. Further, assume that the browser W has a capability expanded so as to interpret the scan tag ST and carry out a process corresponding to the tag.

The input tag IT describes a button BT that a user can push. A push of the button BT starts a process for causing the sensor-equipped liquid crystal panel 301 to capture an image of an object placed on the capturing area RA, and then an image generated as a result of the capture is transmitted by the POST method as described by the form tag FT.

Next, FIG. 13 is a view schematically showing a state where a user places, in the state of FIG. 11, the name card C on the capturing area RA for the purpose of performing capture of an image of the front side of the name card C. In order to cause the image of the front side of the name card C to be captured, the name card C is placed in such a manner that the front side of the name card C is in contact with the sensor-equipped liquid crystal panel 301. In this state, the user can see the back side of the name card C, as shown in FIG. 13.

Then, when the user pushes the button BT while the name card C is placed on the capturing area RA, a process starts for causing the sensor-equipped liquid crystal panel 301 to capture an image of the front side of the name card C placed on the capturing area RA.

Next, FIG. 14 is a view schematically showing an image generated in the data display/sensor apparatus 100, as a result of the sensor-equipped liquid crystal panel 301's capture of the image of the front side of the name card C placed on the capturing area RA.

The data display/sensor apparatus 100 extracts, from an image captured by the entire capture surface of the sensor-equipped liquid crystal panel 301, only a part corresponding to the capturing area RA, so as to generate the image shown in FIG. 14. As such, the generated image and the capturing area RA are identical in size. Then, the extracted image is transmitted to the external server 1000 by the POST method. Note that the extracted image is the captured image CG.

In the case where the user places the name card C within the capturing area RA, the captured image CG includes, as shown in FIG. 14, (i) the characters "MIMURA", which represent a surname, (ii) the characters "YAMATOKORIYAMA-SHI, NARA", which represent an address, and (iii) the characters "mimura@xxx.com", which represent an e-mail address, each of which items are described on the front side of the name card C. Then, in the external server 1000, the character recognition application recognizes these characters indicating the name, address, e-mail address included in the captured image CG, and carries out a process for registering data of the recognized characters in a table stored as an address list in the storage section 1030.

Note that an image of the object captured by the sensor-equipped liquid crystal panel 301 is obtained as a mirror image of the front side of the object. Therefore, the image thus obtained is mirror-reversed by a generally-known method.

(Coordinate System)

In order to extract (cut out) the captured image CG from the image captured by the entire capture surface of the sensor-equipped liquid crystal panel 301, it is necessary to identify information (second area information) indicative of the location of the capturing area RA in a coordinate system (hereinafter, referred to as "desktop coordinate system") whose origin point is a top left vertex (i.e., DO) of the desktop area DA. The information indicative of the location of the capturing area RA is, specifically, a group of coordinates representing representative points (vertexes) of the capturing area RA.

Note that the OS program uses the desktop coordinate system to manage the positions of parts (windows, icons, etc.) shown on the desktop screen. The desktop area DA coincides with the entire display surface of the sensor-equipped liquid crystal panel 301. Therefore, a physical position of the display surface of the sensor-equipped liquid crystal panel 301 is indicated by using the desktop coordinate system.

Here, the browser W shows the capturing area RA in the client area CA. Therefore, the browser W has information (first area information) indicative of the location of the capturing area RA in a coordinate system (hereinafter, referred to as "client coordinate system") whose origin point is a top left vertex (i.e., CO) of the client area CA. Note that the browser W uses the client coordinate system to manage the positions of parts (buttons, icons, characters, etc.) shown in the capturing page CP, which is content.

Therefore, the present embodiment carries out, prior to the process for extracting the captured image CG, a process for converting the information indicative of the location of the capturing area RA in the client coordinate system into the information in the desktop coordinate system. Then, the information obtained by the conversion is used to carry out the process for extracting the captured image CG.

Note that coordinates in the client coordinate system are hereinafter referred to as "client coordinates", and coordinates in the desktop coordinate system is hereinafter referred to as "desktop coordinates".

The following will specifically describe, with reference to FIG. 15, the client coordinates and the desktop coordinates of the capturing area RA. FIG. 15 is a view schematically showing a positional relationship between the desktop area DA, the client area CA, and the capturing area RA.

In FIG. 15, the capturing area RA is a rectangular area where a top left vertex is a point R1 and a bottom right vertex is a point R2.

The points R1 and R2 are represented in the client coordinates as (Xb, Yb) and (Xb+Xc, Yb+Yc), respectively. Note that the browser W has the values "Xb", "Yb", "Xc", and "Yc" in order that to show the capturing area RA in the capturing page CP.

Meanwhile, the points R1 and R2 are represented in the desktop coordinates as (Xa+Xb, Ya+Yb) and (Xa+Xb+Xc, Ya+Yb+Yc), respectively.

That is, in this example, merely adding "Xa" and "Ya" to the client coordinates allows conversion into the desktop coordinates. Thus, it is possible to convert the client coordinates into the desktop coordinates merely by a simple calculation.

In other words, it is possible to find the coordinates after conversion from a relative position between (i) the position of the top left vertex (CO) of the client area CA in the desktop coordinate system and (ii) the positions (R1 and R2) of the capturing area RA in the client coordinate system.

(Overview of the Sensor-Equipped Liquid Crystal Panel)

The sensor-equipped liquid crystal panel 301 included in the data display/sensor apparatus 100 is a liquid crystal panel capable of not only display of data but also detection of an image of an object. Here, the detection of the image of the object means, e.g., (i) detection of a position at which a user points (touches) with his/her finger, a pen, or the like or (ii) capture (scanning) of an image of a printing material or the like. Note that the device to be used for display is not limited to the liquid crystal panel, and may be an organic EL (Electro Luminescence) panel or the like.

Figure 2:
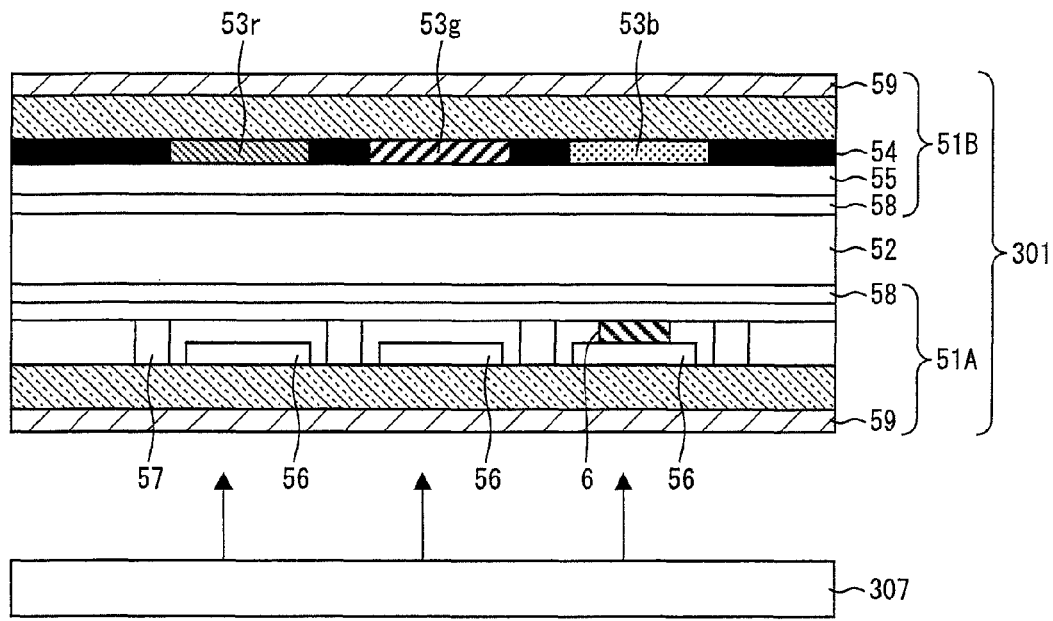
FIG. 2

The following will describe, with reference to FIG. 2, the structure of the sensor-equipped liquid crystal panel 301. FIG. 2 is a view schematically showing a cross-section of the sensor-equipped liquid crystal panel 301. Note that the sensor-equipped liquid crystal panel 301 described herein is just one example. Alternatively, a sensor-equipped liquid crystal panel having any structure may be used, as long as a single surface of the panel serves both as a display surface and a capture surface.

As shown in FIG. 2, the sensor-equipped liquid crystal panel 301 includes an active matrix substrate 51A disposed on a back side of the sensor-equipped liquid crystal panel 301, a counter substrate 51B disposed on a front side thereof, and a liquid crystal layer 52 sandwiched between these substrates. The active matrix substrate 51A includes pixel electrodes 56, data signal lines 57, an optical sensor circuit 32 (not illustrated), an alignment film 58, and a polarizing plate 59. The counter substrate 51B includes color filters 53r (red), 53g (green), and 53b (blue), a light-shielding film 54, a counter electrode 55, an alignment film 58, and a polarizing plate 59. Note that a backlight 307 is provided behind the sensor-equipped liquid crystal panel 301.

A photodiode 6 included in the optical sensor circuit 32 is provided in the vicinity of the pixel electrode 56 for which the blue color filter 53b is provided; however, the present invention is not limited to this. Alternatively, the photodiode 6 may be provided in the vicinity of the pixel electrode 56 for which the red color filter 53r is provided. Further alternatively, the photodiode 6 may be provided in the vicinity of the pixel electrode 56 for which the green color filter 53g is provided.

Figure 3:
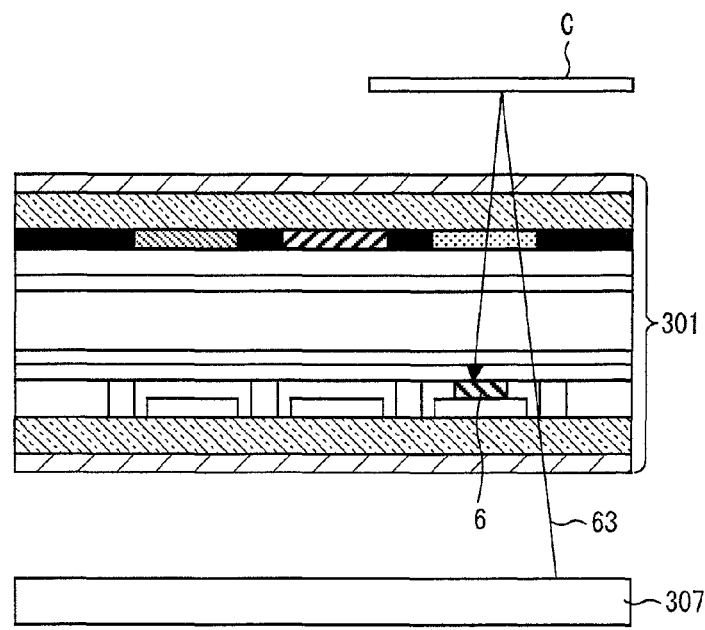
FIG. 3

Next, the following will describe, with reference to FIG. 3, a method of detecting an image of an object. FIG. 3 is a view schematically showing a state in which detection of an image of an object is performed by sensing a reflected image of the object. Light 63 is emitted from the backlight 307, and then the optical sensor circuit 32 including the photodiode 6 senses the light 63 reflected by the object such as the name card C, whereby the reflected image of the object can be sensed. In this manner, the sensor-equipped liquid crystal panel 301 can detect the image of the object by sensing the reflected image thereof.

(Essential Components of the Data Display/Sensor Apparatus)

Figure 4:
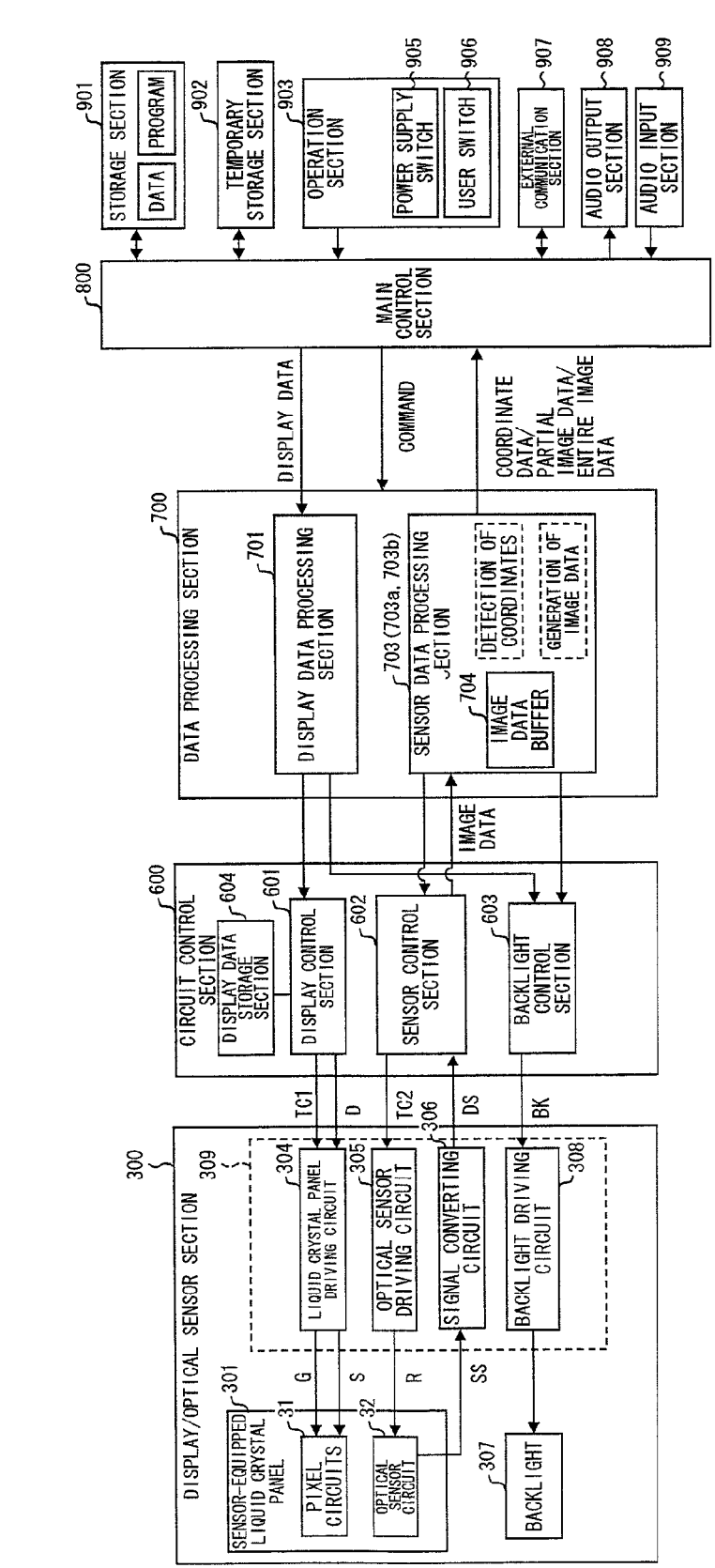
FIG. 4

Next, essential components of the data display/sensor apparatus 100 will be described with reference to FIG. 4. FIG. 4 is a block diagram showing the essential components of the data display/sensor apparatus 100. As shown in FIG. 4, the data display/sensor apparatus 100 includes a display/optical sensor section 300, a circuit control section 600, a data processing section 700, a main control section 800, a storage section 901, a temporary storage section 902, an operation section 903, an external communication section 907, an audio output section 908, and an audio input section 909.

The display/optical sensor section 300 is the so-called liquid crystal display device with built-in optical sensor. The display/optical sensor section 300 includes the sensor-equipped liquid crystal panel 301, the backlight 307, and a peripheral circuit 309 for driving the sensor-equipped liquid crystal panel 301 and the backlight 307.

The sensor-equipped liquid crystal panel 301 includes a plurality of pixel circuits 31 and a plurality of optical sensor circuits 32, both of which are arranged in a matrix manner. Detailed structure of the sensor-equipped liquid crystal panel 301 will be described later.

The peripheral circuit 309 includes a liquid crystal panel driving circuit 304, an optical sensor driving circuit 305, a signal converting circuit 306, and a backlight driving circuit 308.

The liquid crystal panel driving circuit 304 is a circuit that outputs a control signal (G) and a data signal (S) according to a timing control signal (TC1) and a data signal (D) from the display control section 601 of the circuit control section 600, so as to drive the pixel circuits 31. Details of a driving method of the pixel circuits 31 will be described later.

The optical sensor driving circuit 305 is a circuit that applies a voltage to a signal line (R) according to a timing control signal (TC2) from a sensor control section 602 of the circuit control section 600, so as to drive the optical sensor circuit 32. Details of a driving method of the optical sensor circuit 32 will be described later.

The signal converting circuit 306 is a circuit that converts sensor output signals (SS) outputted from the optical sensor circuit 32 into digital signals (DS), and then transmits the resultant digital signals to the sensor control section 602.

The backlight 307 includes a plurality of white LEDs (Light Emitting Diodes) and is disposed on the back of the sensor-equipped liquid crystal panel 301. When the power supply voltage is applied from the backlight driving circuit 308 to the backlight 307, the backlight 307 lights up and illuminates the sensor-equipped liquid crystal panel 301. A color of the LEDs in the backlight 307 is not limited to white and may be any other color. Further, the backlight 307 may include, instead of LEDs, a cold cathode fluorescent tube (CCFL: Cold Cathode Fluorescent Lamp).

When a control signal (BK) from a backlight control section 603 of the circuit control section 600 is in high level, the backlight driving circuit 308 applies the power supply voltage to the backlight 307. Conversely, when the control signal (BK) from a backlight control section 603 is in low level, the backlight driving circuit 308 does not apply the power supply voltage to the backlight 307.

Next, the circuit control section 600 will be described. The circuit control section 600 serves as a device driver that controls the peripheral circuit 309 of the display/optical sensor section 300. The circuit control section 600 includes a display control section 601, a sensor control section 602, a backlight control section 603, and a display data storage section 604.

The display control section 601 receives display data from a display data processing section 701 of the data processing section 700, and transmits the timing control signal (TC1) and the data signal (D) to the liquid crystal panel driving circuit 304 of the display/optical sensor section 300 according to an instruction from the display data processing section 701, so that the display data having been received from the display data processing section 701 is displayed on the sensor-equipped liquid crystal panel 301.

The display control section 601 temporarily stores the display data having been received from the display data processing section 701 into the display data storage section 604. Then, the display control section 601 generates the data signal (D) on the basis of the temporarily stored display data. The display data storage section 604 is, for example, VRAM (video random access memory) or the like.

The sensor control section 602 transmits the timing control signal (TC2) to the optical sensor driving circuit 305 of the display/optical sensor section 300 according to an instruction from a sensor data processing section 703 of the data processing section 700, so that the sensor-equipped liquid crystal panel 301 executes scanning.

Further, the sensor control section 602 receives the digital signals (DS) from the signal converting circuit 306. Then, the sensor control section 602 generates image data on the basis of the digital signals (DS) corresponding to the sensor output signals (SS) having been outputted from all of the optical sensor circuits 32 included in the sensor-equipped liquid crystal panel 301. In other words, the sensor control section 602 generates image data on the basis of an image captured in the entire capturing area of the sensor-equipped liquid crystal panel 301. Then, the sensor control section 602 transmits the image data thus generated to the sensor data processing section 703.

The backlight control section 603 transmits the control signal (BK) to the backlight driving circuit 308 of the display/ optical sensor section 300 according to instructions from the display data processing section 701 and the sensor data processing section 703, so that the backlight 307 is driven by the backlight driving circuit 308.

Assume that the data display/sensor apparatus 100 includes a plurality of display/optical sensor sections 300. In this case, upon receipt of an instruction including the designation of which of the display/optical sensor sections 300 to display the display data from the data processing section 700, the display control section 601 controls the liquid crystal panel driving circuit 304 of the designated display/optical sensor section 300. Further, upon receipt of an instruction including the designation of which of the display/optical sensor sections 300 to scan the object from the data processing section 700, the sensor control section 602 controls the optical sensor driving circuit 305 of the designated display/optical sensor section 300 and receives digital signals (DS) from the signal converting circuit 306 of the designated display/ optical sensor section 300.

Next, the data processing section 700 will be described. The data processing section 700 serves as a middleware that provides an instruction to the circuit control section 600 according to a "command" received from the main control section 800. Details of the command will be described later.

The data processing section 700 includes the display data processing section 701 and the sensor data processing section 703. When the data processing section 700 receives the command from the main control section 800, the display data processing section 701 and/or the sensor data processing section 703 operates according to a value of each field (described later) contained in the received command.

The display data processing section 701 receives display data from the main control section 800, and also provides instructions to the display control section 601 and the backlight control section 603 according to the command having been received by the data processing section 700, so that the received display data is displayed on the sensor-equipped liquid crystal panel 301. Operations of the display data processing section 701 corresponding to commands will be described later.

The sensor data processing section 703 provides instructions to the sensor control section 602 and the backlight control section 603 according to the command having been received by the data processing section 700.

Further, the sensor data processing section 703 receives the image data from the sensor control section 602, and then stores the received image data itself into an image data buffer 704. Subsequently, the sensor data processing section 703 transmits at least one of the following data: "entire image data"; "partial image data (including coordinate data of a partial image)"; and "coordinate data" to the main control section 800, on the basis of the image data stored in the image data buffer 704 according to the command having been received by the data processing section 700. The entire image data, the partial image data, and the coordinate data will be described later. Further, operations of the sensor data processing section 703 corresponding to commands will be described later.

Next, the main control section 800 controls operations of the components included in the data display/sensor apparatus 100. The main control section 800 reads various kinds of programs stored in the storage section 901 to control the components of the data display/sensor apparatus 100 and realize various kinds of functions of the data display/sensor apparatus 100.

The main control section 800 transmits the command and the display data to the data processing section 700, so as to cause the sensor-equipped liquid crystal panel 301 to show the display data and to cause the sensor-equipped liquid crystal panel 301 to perform scanning of the object. Further, in a case where the command designates "data type", the main control section 800 receives, as a response to the command, at least one of the following data: the entire image data; the partial image data; and the coordinate data, from the data processing section 700.

Note that the circuit control section 600, the data processing section 700, and the main control section 800 are each realized by CPU (Central Processing Unit), memory, and the others. Further, the data processing section 700 may be realized by a circuit such as ASIC (application specific integrate circuit).

Next, the storage section 901 stores (1) control programs for the respective components, (2) OS program, (3) application programs, all of which are executed by the main control section 800, and (4) various kinds of data to be read for execution of these programs. The storage section 901 is realized by a non-volatile storage device such as flash memory. The storage section 901 also contains: API (Application Programming Interface) used by the application programs to use the functions of the OS; and a driver for performing communications with various kinds of devices.

The temporary storage section 902 is realized by a volatile storage device such as RAM (Random Access Memory). The temporary storage section 902 is also used as a workspace where data is temporarily held in the process of the main control section 800 executing the above-described programs.

The operation section 903 accepts an input operation from the user of the data display/sensor apparatus 100. The operation section 903 is realized by an input device, such as switches, a remote controller, a mouse, and/or a keyboard, for example. The operation section 903 generates a control signal corresponding to the input operation from the user of the data display/sensor apparatus 100 and then transmits the generated control signal to the main control section 800.

The above switches assume to be hardware switches such as a power supply switch 905 that is an on/off switch for the power supply and a user switch 906 that has predetermined functions assigned.

The data display/sensor apparatus 100 may optionally include: an external communication section 907 for communications with an external device through wireless or wired connection; an audio output section 908 for voice output, such as a speaker; and an audio input section 909 for input of audio signals, such as a microphone.

(Details of the Command)

Figure 5:
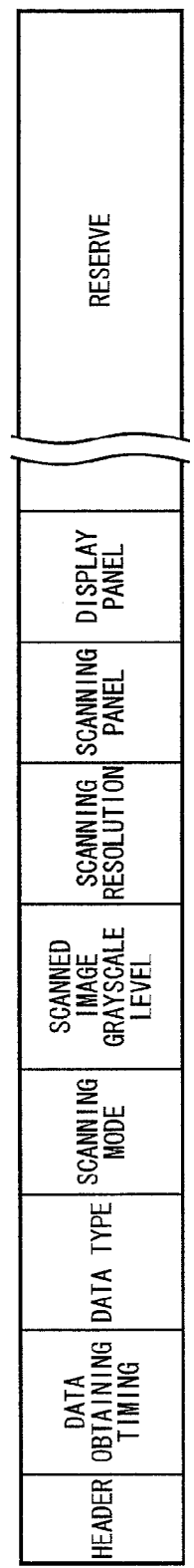
FIG. 5

The following will describe details of the command to be transmitted from the main control section 800 to the data processing section 700 with reference to FIGS. 5 and 6. FIG. 5 is a schematic diagram showing an exemplary frame structure of the command. FIG. 6 is an explanatory view showing exemplary values that can be assigned to each of the fields contained in the command, and showing an overview of the values.

As shown in FIG. 5, the command contains a "header" field; a "data obtaining timing" field, a "data type" field, a "scanning mode" field, a "scanned image grayscale level" field, a "scanning resolution" field, a "scanning panel" field, a "display panel" field, and a "reserve" field. To each of the fields, the values shown in FIG. 6, for example, can be assigned.

The "header" field is a field indicating start of a frame. A value of the "header" field may be any value as long as it can identifies the "header" field.

The "data obtaining timing" field is a field to designate a timing at which data is to be transmitted to the main control section 800. To the "data obtaining timing" field, values of "00" (sense), "01" (event), and "10" (all) can be assigned.

"Sense" specifies immediate transmission of the latest data. Therefore, upon receipt of the command having "sense" assigned as a value of the "data obtaining timing" field, the sensor data processing section 703 immediately transmits the latest data designated by the "data type" filed to the main control section 800.

"Event" specifies transmission at a timing at which there occurs change to the image data received from the sensor control section 602. Therefore, upon receipt of the command having "event" assigned as a value of the "data obtaining timing" field, the sensor data processing section 703 transmits data designated by the "data type" field to the main control section 800 at a timing when a change greater than a predetermined threshold value has occurred to the image data received from the sensor control section 602.

"All" specifies transmission of data at predetermined intervals. Therefore, upon receipt of the command having "all" assigned as a value of the "data obtaining timing" field, the sensor data processing section 703 transmits data designated by the "data type" field to the main control section 800 at predetermined intervals. The predetermined intervals coincide with intervals at which scanning is performed by the optical sensor circuit 32.

Next, the "data type" field is a field to designate a type of data obtained from the sensor data processing section 703. To the "data type" field, values of "001" (coordinates), "010" (partial image), and "100" (entire image), for example, can be assigned. With a sum of any combinations of these values, "coordinates" and either "partial image" or "entire image" are concurrently designated. For example, "011" can be specified for concurrent designation of "coordinates" and "partial image".

Upon receipt of the command having "entire image" assigned as a value of the "data type" field, the sensor data processing section 703 transmits the image data itself stored in the image data buffer 704 to the main control section 800. The image data itself stored in the image data buffer 704 is referred to as "entire image data".

Upon receipt of the command having "partial image" assigned as a value of the "data type" field, the sensor data processing section 703 extracts, from the image data received from the sensor control section 602, a region including a part where a change greater than the predetermined threshold value has occurred, and then transmits image data corresponding to the extracted region to the main control section 800. Here, such image data is referred to as "partial image data". In a case where a plurality of partial image data items have been extracted, the sensor data processing section 703 the extracted partial image data items to the main control section 800.

Further, upon receipt of the command having "partial image" assigned as a value of the "data type" field, the sensor data processing section 703 detects typical coordinates of the partial image data and then transmits, to the main control section 800, coordinate data representing the location of the typical coordinates in the partial image data. Examples of the typical coordinates include center coordinates of the partial image data and barycentric coordinates of the partial image data.

Next, upon receipt of the command having "coordinates" assigned as a value of the "data type" field, the sensor data processing section 703 transmits, to the main control section 800, coordinate data representing the location of the typical coordinates in the entire image data. In a case where a plurality of partial image data items are extracted, the sensor data processing section 703 detects sets of typical coordinates respectively corresponding to the extracted partial image data items in the entire image data, and then transmits, to the main control section 800, coordinate data items representing the respective sets of typical coordinates (multipoint detection).

Specific examples of the entire image data, the partial image data, and the coordinate data will be described later with reference to a schematic diagram.

The "scanning mode" field is a field to designate whether the backlight 307 is to be lit up or not during the execution of scanning. To the "scanning mode" field, values of "00" (reflection), "01" (transmission), and "10" (reflection/transmission), for example, can be assigned.

"Reflection" specifies scanning performed with the backlight 307 lit up. Therefore, upon receipt of the command having "reflection" assigned as a value of the "scanning mode" field, the sensor data processing section 703 provides instructions to the sensor control section 602 and the backlight control section 603, so that the sensor driving circuit 305 and the backlight driving circuit 308 operate in sync with each other.

"Transmission" specifies scanning performed with the backlight 307 turned out. Therefore, upon receipt of the command having "transmission" assigned as a value of the "scanning mode" field, the sensor data processing section 703 provides instructions to the sensor control section 602 and the backlight control section 603, so that the optical sensor driving circuit 305 is operated, but the backlight driving circuit 308 is not operated. "Reflection/transmission" specifies scanning performed with "reflection" and "transmission" used in combination.

The "scanned image grayscale level" field is a field to designate grayscale levels of the partial image data and the entire image data. To the "scanned image grayscale level" field, vales of "00 (binary) and "01" (multilevel), for example, can be assigned.

Upon receipt of the command having "binary" assigned as a value of the "scanned image grayscale level" field, the sensor data processing section 703 transmits, to the main control section 800, the partial image data and the entire image data in the form of monochrome data.

Meanwhile, upon receipt of the command having "multilevel" assigned as a value of the "scanned image grayscale level" field, the sensor data processing section 703 transmits, to the main control section 800, the partial image data and the entire image data in the form of multilevel grayscale data.

The "scanning resolution" field is a field to designate resolutions of the partial image data and the entire image data. To the "resolution" field, values of "0" (high) and "1" (low), for example, can be assigned.

"High" specifies a high resolution. Therefore, upon receipt of the command having "high" assigned as a value of the "scanning resolution" field, the sensor data processing section 703 transmits to the main control section 800 the partial image data and the entire image data at high resolutions. For example, it is desirable that "high" is designated for image data to be subjected to image processing, such as image recognition (image data of a fingerprint).

"Low" specifies a low resolution. Therefore, upon receipt of the command having "low" assigned as a value of the "scanning resolution" field, the sensor data processing section 703 transmits the partial image data and the entire image data at low resolutions to the main control section 800. For example, it is desirable that "low" is designated for image data which sufficiently identifies the position or the like of a touch (e.g. image data of a finger or a hand touched).

The "scanning panel" field is a field to designate which of the display/optical sensor sections 300 to scan the object. To the "scanning panel" field, values of "001" (first display/optical sensor section 300) and "010" (second display/optical sensor section 300), for example, can be assigned. With a sum of these values, a plurality of display/optical sensor sections 300 can be concurrently designated. For example, "011" can be assigned for concurrent designation of the first and second display/optical sensor sections 300.

The sensor data processing section 703 provides instructions to the sensor control section 602 and the backlight control section 603, so that the sensor control section 602 and the backlight control section 603 control the optical sensor driving circuit 305 and the backlight driving circuit 308 of the display/optical sensor section 300 designated by the "scanning panel" field contained in the received command.

The "display panel" field is a field to designate which of the display/optical sensor sections 300 to show the display data. To the "display panel" field, values of "001" (first display/optical sensor section 300) and "010" (second display/optical sensor section 300), for example, can be assigned. With a sum of these values, a plurality of display/optical sensor sections 300 can be concurrently designated. For example, "011" can be assigned for concurrent designation of the first and second display/optical sensor sections 300.

For example, upon receipt of the command having "first display/optical sensor section 300" assigned as a value of the "display panel" field, the display data processing section 701 provides instructions to the display control section 601 and the backlight control section 603, so that under control of the display control section 601 and the backlight control section 603 the liquid crystal panel driving circuit 304 and the backlight driving circuit 308 of the display/optical sensor section 300 cause the first display/optical sensor section 300 to show the display data.

Hereinafter, for the purpose of explanation, the data display/sensor apparatus 100 according to the present embodiment assumes to include one display/optical sensor section 300. Therefore, in order to perform scanning, the command having "first display/optical sensor section (001)" assigned as a value of the "scan panel" field is transmitted to the data processing section 700. Further, in order to perform data display, the command having "first display/optical sensor section (001)" assigned as a value of the "display panel" field is transmitted to the data processing section 700.

Next, the "reserve" field is a field to specify any further information other than the information items that can be specified in the foregoing fields, if necessary.

For the applications executed by the main control section 800, all of the foregoing fields are not necessarily used in transmitting the command. In this case, an invalid value (NULL value, etc.) is set in unnecessary fields to use.

Further, in order to obtain coordinate data corresponding to a position at which the user touches with his/her finger, a pen, or the like, the command having "coordinates" assigned in the "data type" field is transmitted to the data processing section 700. Since the finger, the pen, etc. are movable, it is desirable that "all" is assigned in the "data obtaining timing" field of the command in order to obtain the "coordinate data". Further, scanning accuracy is not necessarily high since it is essential only that the coordinate data corresponding to the position at which the user touches can be obtained. Therefore, "low" should be set as a value of the "resolution" field of the command.

Still further, under the situation where "coordinates" is assigned in the "data type" field of the command, assume that the user touches the sensor-equipped liquid crystal panel 301 with his/her plural fingers or plural pens at the same time. even in this case, it is possible to obtain coordinate data items respectively corresponding to the positions at which the user touched (multipoint detection).

Yet further, in order to obtain image data of a document or the like, the command having "entire image" assigned in the "data type" field is transmitted to the data processing section 700. Generally, the document or the like is scanned while it is remained still. Therefore, it is not necessary to perform scanning periodically. In this case, it is desirable that "sense" or "event" is assigned in the "data obtaining timing" field. For scanning of the document or the like, it is desirable that the document or the like is scanned with a high degree of accuracy in order to increase user's readability of characters. Therefore, it is desirable that "high" is assigned in the "resolution" field.

(Entire Image Data/Partial Image Data/Coordinate Data)

Giving an example, the following will describe the entire image data, the partial image data, and the coordinate data with reference to FIG. 7. Image data shown in (a) of FIG. 7 is image data obtained as a result of scanning of the entire sensor-equipped liquid crystal panel 301 when the object is not placed on the sensor-equipped liquid crystal panel 301. Further, image data shown in (b) of FIG. 7 is image data obtained as a result of scanning of the entire sensor-equipped liquid crystal panel 301 when the user is touching the sensor-equipped liquid crystal panel 301 with his/her finger.

User's touch of the sensor-equipped liquid crystal panel 301 with his/her finger changes the amount of light received by the optical sensor circuit 32 in an area around the touched spot. Accordingly, there occurs a change in voltage to be outputted by the optical sensor circuit 32. As a result of this, there occurs change in brightness level as pixel values at the spot touched by the user in the image data generated by the sensor control section 602.

In the image data shown in (b) of FIG. 7, brightness level as pixel values at a spot corresponding to the user's finger is higher, as compared with the image data shown in (a) of FIG. 7. In (b) of FIG. 7, the "partial image data" is image data corresponding to a smallest rectangular area (area PP) including pixel values with great changes in brightness level compared with a predetermined threshold value.

The "entire image data" is image data corresponding to the area AP.

Further, coordinate data of typical coordinates Z of the partial image data (area PP) in the entire image data (area AP) is represented by (Xa, Ya). Coordinate data of the typical coordinates Z in the partial image data (area PP) is represented by (Xp,Yp).

(Structure of the Sensor-Equipped Liquid Crystal Panel)

The following will describe the structure of the sensor-equipped liquid crystal panel 301 and the structure of the peripheral circuit 309 around the sensor-equipped liquid crystal panel 301, with reference to FIG. 8. FIG. 8 is a block diagram showing essential components of the display/optical sensor section 300, particularly, the structure of the sensor-equipped liquid crystal panel 301 and the structure of the peripheral circuit 309.

The sensor-equipped liquid crystal panel 301 includes: the pixel circuits 31 for setting optical transmittance (luminance); and the optical sensor circuits 32 that each outputs a voltage corresponding to light intensity of light received by the optical sensor circuits 32. The term "pixel circuit 31" collectively refers to an R pixel circuit 31*r*, a G pixel circuit 31*g*, a B pixel circuit 31*b* respectively corresponding to red, green, blue color filters.

On the sensor-equipped liquid crystal panel 301 are arranged m-number of the pixel circuits 31 in the column direction (longitudinal direction) and 3n-number of the pixel circuits 31 in the row direction (lateral direction). A group of the R pixel circuit 31*r*, the G pixel circuit 31*g*, and the B pixel circuit 31*b*, all of which form one pixel, are contiguously arranged in the row direction (lateral direction). The group of these pixel circuits forms one pixel.

Setting of the optical transmittances for the pixel circuits 31 is performed as follows. First, to a scanning signal line Gi connected to a gate terminal of a TFT (Thin Film Transistor) 33 included in the pixel circuit 31, a high-level voltage (voltage that turns the TFT 33 on) is applied. Then, a predetermined voltage is applied to a data signal line SRj connected to a source terminal of the TFT 33 in the R pixel circuit 31*r*. In the same manner, optical transmittances for the G pixel circuit 31*g* and the B pixel circuit 31*b* are set. Setting of the optical transmittances for these pixel circuits allows for image display on the sensor-equipped liquid crystal panel 301.

Next, the optical sensor circuits 32 are arranged for each pixel. Alternatively, the optical sensor circuits 32 may be arranged respectively in the vicinities of the R pixel circuit 31*r*, the G pixel circuit 31*g*, and the B pixel circuit 31*b*.

In order to cause the optical sensor circuit 32 to output a voltage corresponding to light intensity, the followings are performed. First, a predetermined voltage is applied to a sensor reading line RWi connected to one electrode of the capacitor 35 and to a sensor reset line RSi connected to an anode terminal of a photodiode 36. In this state, when light is directed to the photodiode 36, a current corresponding to the amount of incident light is flown to the photodiode 36. Then, according to the current flown to the photodiode 36, a voltage lowers across a node at which the other electrode of the capacitor 35 and the cathode terminal of the photodiode 36 are connected to each other (the node is hereinafter referred to as connection node V). Then, when a power supply voltage VDD is applied to a voltage application line SDj that is connected to a drain terminal of a sensor preamplifier 37, a voltage across the connection node V is amplified, and the amplified voltage is outputted from a source terminal of the sensor preamplifier 37 to a sensing data output line SPj. Thus, on the basis of the outputted voltage, the amount of light received by the optical sensor circuit 32 can be calculated.

Next, the following will describe the liquid crystal panel driving circuit 304, the optical sensor driving circuit 305, and a sensor output amplifier 44, all of which are peripheral circuits around the sensor-equipped liquid crystal panel 301.

The liquid crystal panel driving circuit 304 is a circuit for driving the pixel circuits 31 and includes a scanning signal line driving circuit 3041 and a data signal line driving circuit 3042.

The scanning signal line driving circuit 3041 sequentially selects, according to the timing control signal TC1 having been received from the display control section 601, one scanning signal line from among the scanning signal lines G1 through Gm in each line period of time, and a high-level voltage is applied to the selected scanning signal line, and a low-level voltage is applied to the other scanning signal lines.

The data signal line driving circuit 3042 applies, on the basis of the display data D (DR, DG, and DB) having received from the display control section 601, a predetermined voltage corresponding to the one line's display data to data signal lines SR1 through SRn, SG1 through SGn, and SB1 through SBn in each line period of time (line sequential mode). Alternatively, the data signal line driving circuit 3042 may perform driving in a dot sequential mode.

The optical sensor driving circuit 305 is a circuit for driving the optical sensor circuits 32. The optical sensor driving circuit 305 applies, on the basis of a timing control signal TC2 having been received from the sensor control section 602, a predetermined reading voltage to one sensor reading signal line selected in each line period of time from among sensor reading signal lines RW1 through RWm, and the optical sensor driving circuit 305 applies a voltage other than the predetermined reading voltage to the other sensor reading signal lines. In the same manner, the optical sensor driving circuit 305 applies, on the basis of the timing control signal TC2, a predetermined reset voltage to one sensor reset signal line selected in each line period of time from among sensor reset signal lines RS1 through RSm, and the optical sensor driving circuit 305 applies a voltage other than the predetermined reset voltage to the other sensor reset signal lines.

Sensing data output signal lines SP1 through SPn are divided into a p-number of groups (p is an integer not less than 1 and not greater than n). The sensing data output signal lines that belong to each group are connected to the sensor output amplifier 44 via a switch 47 that is sequentially turned on by time division. The sensor output amplifier 44 amplifies a voltage from a group of the sensing data output signal lines connected via the switch 47, and then outputs the amplified voltage, as a sensor output signal SS (SS1 through SSp), to the signal converting circuit 306.

(More Specific Configuration of the Data Display/Sensor Apparatus)

Figure 1:
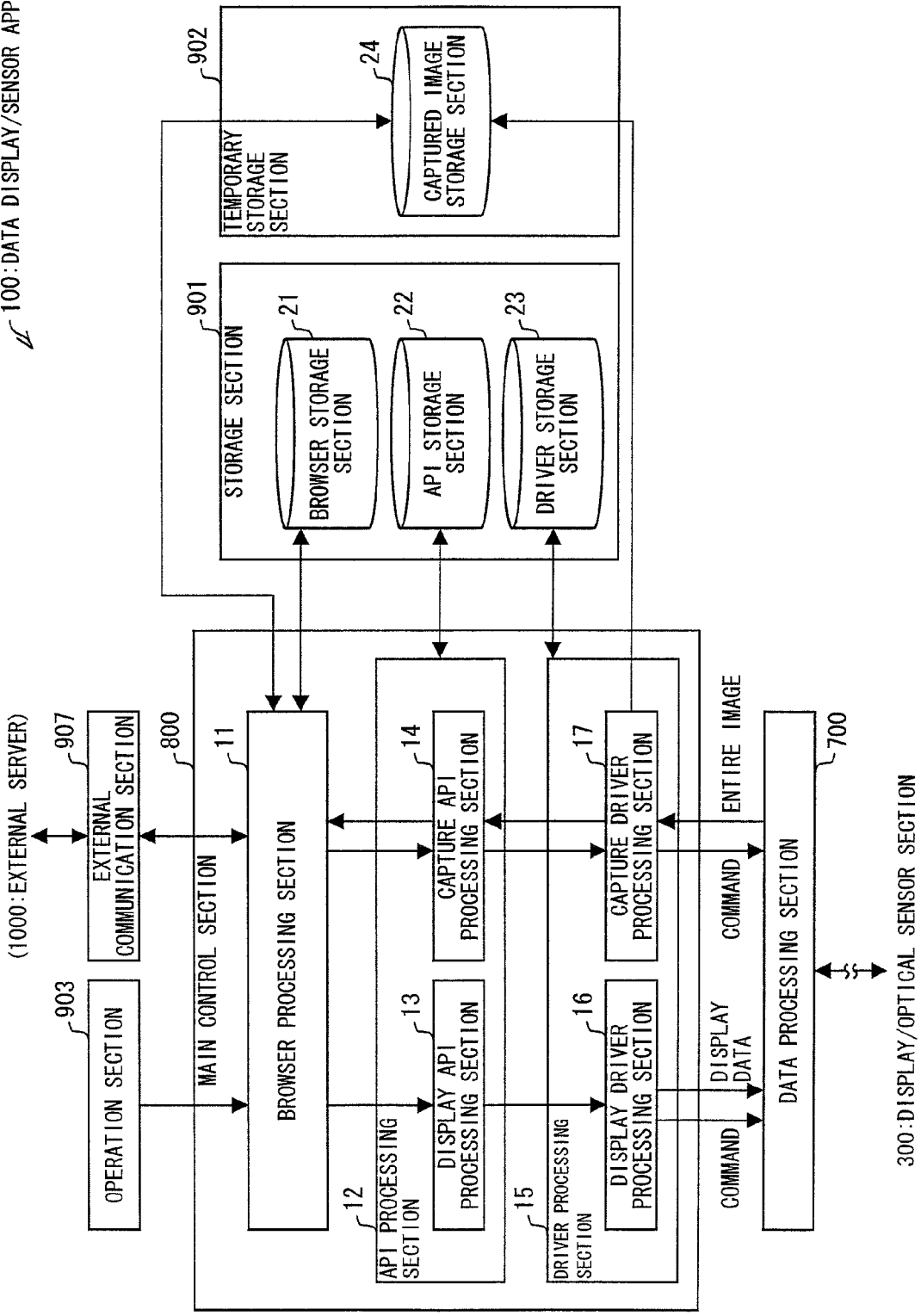
FIG. 1

The following will describe more specific configuration of the data display/sensor apparatus 100 with reference to FIG. 1. To make the following explanation more easily understandable, explanations of operations of the data processing section 700 and the circuit control section 600, both of which are located between the main control section 800 and the display/optical sensor section 300, will be omitted. To be precise, for the display of data and the capture of an image of the object, each component of the main control section 800 transmits a command to the data processing section 700, the data processing section 700 controls the circuit control section 600 on the basis of the command, and the circuit control section 600 then transmits a signal to the display/optical sensor section 300. Further, the main control section 800 obtains from the data processing section 700 the entire image, etc. as a response to the command having been transmitted to the data processing section 700.

FIG. 1 is a block diagram showing more specific configurations of the main control section 800, the storage section 901, and the temporary storage section 902 in the data display/sensor apparatus 100.

As shown in FIG. 1, the main control section 800 includes: a browser processing section (window display controlling means, source code obtaining means, and image transmitting means) 11; an API processing section (coordinates converting means) 12; and a driver processing section (image deriving means and image storing means) 15.

First, the browser processing section 11 will be described. The browser processing section 11 reads and executes a program for the browser W stored in a browser storage section 21, which will be described later. The browser W executed by the browser processing section 11 makes a request for obtaining the source H describing the capturing page CP to the external server 1000 via the external communication section 907, and the browser W receives the source H from the external server 1000. To display the capturing page CP on the basis of the received source H, the browser W calls up a display API. The display API is executed by an API processing section 13, which will be described later, and the display API is an API for performing communications with a display driver, which will be described later.

The browser W executed by the browser processing section 11 may be identical to a browser that has the same functions as those of a generally known WWW browser (Internet Explorer, etc.), except that the browser W has a capability extended so as to interpret the aforementioned scan tag ST. Explanation of details of the browser W will be therefore omitted.

Further, the timing at which the source H is obtained from the external server 1000 is not particularly limited. For example, the source H may be obtained when the user has inputted a URL indicating the location of the source H to the browser W. Alternatively, the source H may be obtained at the startup of the browser W.

When the browser W executed by the browser processing section 11 accepts an instruction to execute capture of an image of the object (push of a button or the like operation) from the user, the browser W calls up a capture API for the purpose of performing capture of an image of the object. In this case, the browser W obtains client coordinates of the capturing area RA, which is described in the source H, and calls up the capture API with the obtained client coordinates an argument.

Note that the capture API is executed by a capture API processing section 14, which will be described later, and the capture API is an API for performing communications with a capture driver, which will be described later.

Further, the browser W executed by the browser processing section 11 receives information by which an address inside a captured image storage section 24 can be identified, as a response (return value) from the capture API that has been called up. The captured image storage section 24 will be described later. Note that captured image CG is stored at the address of the captured image storage section 24, as will be described later. The browser W reads the captured image CG stored at the address identified by the received information, and then transmits the read captured image CG to the external server 1000 via the external communication section 907.

Next, the API processing section 12 will be described. The API processing section 12 reads and executes the display API and the capture API, both of which are stored in an API storage section 22. The API storage section 22 will be described later. The display API and the capture API are APIs for the browser W reading the functions of the OS program. The API processing section 12 includes a display API processing section 13 and a capture API processing section 14.

The display API processing section 13 reads the display API from the API storage section 22, and then executes the display API. When the browser W calls up the display API for the purpose of displaying the capturing page CP, the display API processing section 13 executes the display API. Then, the display API calls up the display driver for the purpose of displaying the capturing page CP.

Note that the display driver is executed by a display driver processing section 16, and the display driver is a driver program for performing communications with the data processing section 700. The display driver processing section 16 will be described later.

The capture API processing section 14 reads the capture API from the API storage section 22 and then executes the capture API. When the browser W calls up the capture API for the purpose of performing capture of an image of the object, the capture API processing section 14 executes the capture API.

First, the capture API converts the client coordinates of the capturing area RA, which are designated as an argument at the calling, into desktop coordinates. Then, for the purpose of capturing an image of the object, the capture driver is further called up. In this case, the capture API calls up the capture driver with the desktop coordinates of the capturing area RA, which have been obtained after the conversion, as an argument.

Note that the capture driver is executed by a capture driver processing section 17, and the capture driver is a driver program for performing communications with the data processing section 700. The capture driver processing section 17 will be described later.

Further, the capture API receives information by which an address inside the captured image storage section 24 can be identified, as a response (return value) from the capture driver that has been called up. Then, the capture API transmits the received information as a return value to the browser W, which is a calling end.

Next, the driver processing section 15 will be described. The driver processing section 15 reads and executes the display driver and the capture driver, both of which are stored in a driver storage section 23. The driver storage section 23 will be described later. For this purpose, the driver processing section 15 includes a display driver processing section 16 and a capture driver processing section 17.

The display driver processing section 16 reads the display driver from the driver storage section 23, and then executes the display driver. When the display API calls up the display driver for the purpose of displaying the capturing page CP, the display driver processing section 16 executes the display driver. Then, the display driver generates display data in order to cause the capturing page CP to be displayed on the sensor-equipped liquid crystal panel 301, and then transmits the generated display data to the data processing section 700. Correspondingly, the display driver transmits to the data processing section 700 a command having "001" (first display/optical sensor section) assigned as a value of the "display panel" field.

The capture driver processing section 17 reads the capture driver from the driver storage section 23, and then executes the capture driver. When the capture API calls up the capture driver for the purpose of performing capture of an image the object, the capture driver processing section 17 executes the capture driver. Then, the capture driver generates a command in order to cause the sensor-equipped liquid crystal panel 301 to perform capture of an image of the object, and then transmits the generated command to the data processing section 700.

Note that the following values are assigned in the fields of the above-generated command. That is, "01 (event)" is assigned as a value of the "data obtaining timing" field, "100" (entire image) is assigned as a value of the "data type" field, "00" (reflection) is assigned as a value of the "scanning mode" field, "01" (multilevel) is assigned as a value of the "scanned image grayscale level" field, "0" (high) is assigned as a value of the "scanning resolution" field, "001" (first display/optical sensor section) is assigned as a value of the "scan panel" field.

As described above, particularly, in order to obtain the entire image from the data processing section 700, "100" (entire image) is assigned as a value of the "data type" field. Further, since capture of an image of a front side of the name card C and character recognition subjected by the external server 1000 are assumed, it is desirable that values in the "scanned image grayscale level" field and in the "scanning resolution" field are "01" (multilevel) and "0" (high), respectively.

Further, with the above command, the capture driver obtains the entire image from the data processing section 700, as a result of causing the sensor-equipped liquid crystal panel 301 to execute the capture. Then, the capture driver performs a process of extracting the captured image CG from the obtained entire image, using the desktop coordinates of the capturing area RA, which have been designated as an argument at the calling.

Then, the capture driver stores the extracted captured image CG in the captured image storage section 24 and transmits information by which an address where the captured image CG is stored can be identified, as a return value, to the capture API, which is a calling end.

The storage section 901 includes the browser storage section 21, the API storage section 22, and the driver storage section 23. The browser storage section 21 stores a browser W's program in a readable form. The API storage section 22 stores the display API and the capture API in readable forms. The driver storage section 23 stores the display driver and the capture driver in readable forms.

The temporary storage section 902 includes the captured image storage section 24. The captured image storage section 24 stores the captured image CG that is stored by the capture driver, which is executed by the capture driver processing section 17. It is essential that the captured image CG is stored in the captured image storage section 24 at least during a time until it is read by the browser W executed by the browser processing section 11. Therefore, for the realization of a higher level of security, the captured image CG may be deleted immediately after it is read by the browser W.

(Flow of a Process for Performing Capture of an Image of the Object)

Next, with reference to FIG. 16, the following will describe an example of a flow in which the data display/sensor apparatus 100 according to the present embodiment performs capture of an image of the object placed on the place where the capturing area RA is displayed, and the external server subjects the captured image to character recognition.

FIG. 16 is a flowchart showing a flow in which the data display/sensor apparatus 100 according to the present embodiment performs capture of an image of the object placed on the place where the capturing area RA is displayed, and the external server subjects the captured image to character recognition.

First, when the user provides an instruction to obtain the capturing page CP by inputting the URL indicating the location of the source H that describes the capturing page CP to the browser W or by the like operation (step S11), the browser W executed by the browser processing section 11 requests the external server 1000 via the external communication section 907 to obtain the source H (step S12). Then, in response to the request, the external server 1000 transmits the source H (step S13).

Next, upon receipt of the source H from the external server 1000, the browser W calls up the display API for the purpose of displaying the capturing page CP on the basis of the received source H (step S14). When the display API is called up, the display API processing section 13 executes the display API. The display API further calls up the display driver (step S15).

When the display driver has been called up, the display driver processing section 16 executes the display driver. Then, the display driver generates the display data for the purpose of causing the capturing page CP to be displayed on the sensor-equipped liquid crystal panel 301, then and transmits the generated display data to the data processing section 700 and transmits a command having "001" (first display/optical sensor section) as a value of the "display panel", to the data processing section 700 (step S16).

Then, the data processing section 700 controls the circuit control section 600 according to the display data and the command, and the circuit control section 600 transmits a signal to the sensor-equipped liquid crystal panel 301, so that the capturing page CP is displayed on the sensor-equipped liquid crystal panel 301 (step S17).

After the capturing page CP has been displayed on the sensor-equipped liquid crystal panel 301, the user places the name card C, as the object, at the place where the capturing area RA is shown, on the sensor-equipped liquid crystal panel 301 (step S18), and the user provides an instruction to carry out capture of an image of the object, with a push of a "SEND" button or by the like operation (step S19). Then, the browser W obtains the client coordinates of the capturing area RA, and calls up the capture API with the obtained client coordinates as an argument (step S20).

When the capture API is called up, the capture API processing section 14 executes the capture API. The capture API converts the client coordinates of the capturing area RA, which are designated as an argument at the calling, into the desktop coordinates, and then calls up the capture driver with the desktop coordinates as an argument (step S21).

When the capture driver has been called up, the capture driver processing section 17 executes the capture driver. Then, the capture driver generates a command for the purpose of causing the sensor-equipped liquid crystal panel 301 to perform capture of an image of the object, and then transmits the generated command to the data processing section 700 (step S22). The fields in the generated command are the ones as described previously. Particularly, "100" (entire image) is assigned as a value of the "data type" field in order to obtain the entire image from the data processing section 700.

The data processing section 700 controls the circuit control section 600 according to the command, and the circuit control section 600 transmits a signal to the display/optical sensor section 300. This causes the sensor-equipped liquid crystal panel 301 to carry out capture of an image of the object. Then, the data processing section 700 generates the entire image as a capturing result and then transmits the entire image to the capture driver (step S23).

When the capture driver obtains the entire image from the data processing section 700, the capture driver performs a process of extracting the captured image CG from the obtained entire image, using the desktop coordinates of the capturing area RA, which have been designated as an argument at the calling. Subsequently, the capture driver stores the extracted captured image CG in the captured image storage section 24, and transmits information by which an address where the captured image CG is stored can be identified, as a return value, to the capture API, which is a calling end (step S24).

When the capture API receives the information by which the address can be identified from the capture driver, the capture API further transmits the received information, as a return value, to the browser W, which is a calling end (step S25).

Upon receipt of the information by which the address can be identified from the capture API, the browser W reads the captured image CG that is stored at the address identified by the received information, and then transmits the read captured image CG to the external server 1000 via the external communication section 907 (step S26).

Upon receipt of the image from the browser W, the external server 1000 stores the incoming captured image CG in the storage section 1030 (step S27), and starts the character recognition application to perform a process of recognizing characters from the captured image CG stored in the storage section 1030 (step S28).

[Variation Examples]

(Conversions of the Coordinate System of the Display Surface and the Coordinate System of the Capture Surface on the Sensor-Equipped Liquid Crystal Panel 301)

On the sensor-equipped liquid crystal panel 301, the resolution of the display surface is not necessarily the same as the resolution of the capture surface. For example, there can be a case where the display surface provides a 1024×768 resolution, whereas the capture surface provides a 2048×1536 resolution, which is twice the resolution of the display surface. As in this case, in a case where the resolution of the display surface is different from the resolution of the capture surface in the sensor-equipped liquid crystal panel 301, it is necessary to convert information (coordinates) indicating the location of the capturing area RA in the display surface into information (coordinates) indicating the location of the capturing area RA in the capture surface, for proper extraction of the captured image CG.

The following will describe a specific example of the conversion. For example, assume that the display surface provides a 1024×768 resolution, and the capturing area RA in the display surface is a rectangular area surrounded by coordinates (x1$d$, y1$d$) and coordinates (x2$d$, y2$d$). Further, assume that the capture surface provides a 2048×1536 resolution, and an area corresponding to the capturing area RA in an image captured by the entire capture surface is a rectangular area surrounded by coordinates (x1$s$, y1$s$) and coordinates (x2$s$, y2$s$).

In this case, the coordinates (x1$s$, y1$s$) and the coordinates (x2$s$, y2$s$) can be found by conversions of the coordinates (x1$d$, y1$d$) and the coordinates (x2$d$, y2$d$) as expressed by the following equations:

$$(x1s, y1s) = (x1d \times 2, y1d \times 2); \text{ and}$$

$$(x2s, y2s) = (x2d \times 2 + 1, y2d \times 2 + 1).$$

The above conversion process may be performed by the capture API or by the capture driver.

(Entities that Execute the Foregoing Processes)

In the above descriptions, (1) the browser W executed by the browser processing section 11 obtains the client coordinates of the capturing area RA, (2) the capture API executed by the capture API processing section 14 converts the client coordinates of the capturing area RA into the desktop coordinates, and (3) the capture driver executed by the capture driver processing section 17 generates the command which causes the sensor-equipped liquid crystal panel 301 to perform capture of an image of the object. However, the entities that execute these processes are not limited to these entities.

For example, the entity that converts the client coordinates into the desktop coordinates may be the browser W or the capture driver. However, for easier development of the application program, it is desirable that the coordinates conversion process is performed by the capture API or the capture driver, both of which are located at lower layers.

Further, in the above descriptions, (4) the capture driver executed by the capture driver processing section 17 extracts the captured image CG from the entire image and then stores the captured image. CG in the captured image storage section 24, (5) the browser W executed by the browser processing section 11 reads the captured image CG from the captured image storage section 24. However, the entities that execute these processes are not limited to these entities.

For example, the entity that extracts the captured image CG from the entire image may be the capture API or the browser W.

In the above descriptions, the main control section 800 consists of the following three layers: the browser processing section 11; the API processing section 12; and the driver processing section 15. However, this is not the only possibility. For example, the API processing section 12 and the driver processing section 15 may be an integral unit, so that the main control section 800 consists of the two layers as a whole. Alternatively, the browser processing section 11, the API processing section 12, and the driver processing section 15 may be an integral unit, so that the main control section 800 consists of the one layer as a whole.

(Variations of the Description of the Capturing Page CP)

The above descriptions has presented the approach of describing the source H for the capturing page CP, using an HTML capable of describing the scan tag ST. This approach requires the HTML to be extended from the standards, and also requires a capability of the browser W to be extended so that the browser W can support the extended HTML. However, such an approach is effective in allowing the user to use the system 1100 simply by installation of the capability-extended browser W on the data display/sensor apparatus 100.

Moreover, the above approach is also effective in allowing a provider of the capturing page CP to easily describe the source H, since it is simply a matter of describing the scan tag ST in the source H.

Alternatively, the capturing page CP may be described using a script language such as Java® Script. This alternative approach also requires specifications of the script language to be extended, and also requires a capability of the browser W to be extended so that the browser W can interpret the extended script language. However, such an alternative approach is effective in allowing the user to use the system 1100 simply by installation of the capability-extended browser W on the data display/sensor apparatus 100.

Moreover, the above alternative approach is also effective in allowing the provider of the capturing page CP to create a dynamic Web page, although the provider of the capturing page CP needs to describe a script in the extended script language.

Further alternatively, the capturing page CP may be realized by a plug-in that provides instructions to perform display and capture. This approach is effective since it eliminates the above-described requirements, i.e. extensions of the HTML standards and of the specifications of the script language, and extension of the capability of the browser W.

However, the further alternative approach requires the user to install the plug-in, and also requires the provider of the capturing page CP to create such a capturing page CP that calls up the plug-in at the time of displaying the capturing page CP.

(Measure to be Taken when a Part of the Capturing Area is Hidden and Not Shown)

In some case, a part of the client area CA is hidden and not shown due to the user's operations, such as scrolling of the browser W through a scroll bar or reduction of the size of the browser W. In such a case, it is desirable that the user is prompted to perform an appropriate operation to bring the entire capturing area RA into view.

An exemplary message given to the user is described with reference to FIG. 17. FIG. 17 is a diagram showing an exemplary message given to the user when the part of the capturing area RA is hidden and not shown. In an example of FIG. 17, a message MS is shown to prompt the user to perform an appropriate operation to show the entire capturing area RA.

(Response from the External Server)

In the above descriptions, the external server 1000 is not arranged to transmit a response to the reception of the captured image CG to the data display/sensor apparatus 100. However, the external server 1000 may be arranged to transmit the response to the data display/sensor apparatus 100, and the data display/sensor apparatus 100 may be arranged to display the content of the response. This allows the user of the data display/sensor apparatus 100 to check to see the completion of the processing performed by the external server 1000 and whether or not the processing desired by the user has been executed.

The content of the response may be, for example, a message containing the fact that the external server 1000 has received the captured image CG, a screen showing the captured image CG that the external server 1000 has received, or a screen showing characters that the character recognition application has recognized.

(Arrangement in which the Capture is Performed Only by a Predetermined Area of the Capture Surface)

The above descriptions have dealt with the arrangement where the sensor-equipped liquid crystal panel 301 causes the entire capture surface thereof to sense the object image located in the vicinity thereof. Alternatively, the sensor-equipped liquid crystal panel 301 may cause a predetermined area of the capture surface thereof to sense the object image located in the vicinity thereof (i.e. the capture is performed only by a part of the capture surface).

In this case, the main control section 800 transmits to the data processing section 700 a command containing information that designates the predetermined area of the capture surface of the sensor-equipped liquid crystal panel 301. The data processing section 700 controls the circuit control section 600 according to the command. Under the control of the data processing section 700, the circuit control section 600 transmits a signal to the display/optical sensor section 300. Further, the main control section 800 obtains image data captured by the predetermined area of the capture surface from the data processing section 700, as a response to the command transmitted to the data processing section 700.

In a case where the predetermined area is identical to the capturing area RA subjected to capture, the image itself obtained by the data processing section 700 is the captured image CG. This, therefore, eliminates the need for the extraction process performed by the capture driver.

(Entities to be Controlled by the Main Control Section 800)

Further, in the above descriptions, the data display/sensor apparatus 100 is arranged to include the data processing section 700 and the circuit control section 600. However, this is not the only possibility. For example, the main control section 800 may be arranged to directly control the circuit control section 600 so that the main control section 800 generates the entire image data/partial image data/coordinate data. Moreover, the main control section 800 may be arranged to directly control the display/optical sensor section 300.

[Additional Remarks]

As described above, an apparatus for displaying an image and sensing an object image according to the present invention is an apparatus for displaying an image and sensing an object image, the apparatus comprising a panel component that displays an image and captures an object image located in the vicinity of the panel component, the apparatus for displaying an image and sensing an object image, the apparatus further comprising: window display control means that causes a window including a placement area to be displayed on the panel component, the placement area being an area for placing an object; coordinates converting means that converts first area information into second area information, the first area information indicating the location of the placement area in the window, the second area information indicating the location of the placement area in the panel component; and image deriving means that derives a captured image, the captured image being an image of the object located in the vicinity of the panel component and captured through an area defined by the second area information.

Further, a method for controlling an apparatus for displaying an image and sensing an object image, according to the present invention, is a method for controlling an apparatus for displaying an image and sensing an object image, the apparatus comprising a panel component that displays an image and captures an object image located in the vicinity of the panel component, the method comprising: a window display control step of causing a window including a placement area to be displayed on the panel component, the placement area being an area for placing an object; a coordinates converting step of converting first area information into second area information, the first area information indicating the location of the placement area in the window, the second area information indicating the location of the placement area in the panel component; and an image deriving step of deriving a captured image, the captured image being an image of the object located in the vicinity of the panel component and captured through an area defined by the second area information.

This makes it possible to obtain the second area information from the first area information. Therefore, wherever the window is displayed on the display surface, and wherever the placement area is placed in the window, it is possible to determine the position of the placement area in the panel component. Thus, it is possible to reliably determine the capturing area in the panel component.

This yields the effect of causing the panel component to reliably capture the image of the object placed on the placement area in the window. That is, this yields the effect of causing the panel component to reliably capture the image of the object placed on the placement area, which is not shown at a fixed position in the panel component.

Still further, in the above arrangement, an apparatus for displaying an image and sensing an object image according to the present invention may be such that the first area information is contained in source code, the source code defining content that is shown in the window and contains the placement area, and the window display control means causes the window to be displayed on the panel component, according to the source code, in such a state where the content containing the placement area is located in the window.

According to the above arrangement, the first area information is contained in source code, the source code defining content that contains the placement area, and the window can be caused to be displayed on the panel component, according to the source code, in such a state where the content containing the placement area is located in the window.

Therefore, it is possible to cause the location of the content containing the placement area in the window to be defined by the source code, and it is possible to cause the placement area to be shown in the window, according to the defined source code. Thus, it is possible to cause the panel component to capture the image of the object placed in the placement area which has been shown according to the source code.

This yields the effect of allowing a provider of the content (a provider of the source code) to create the content that provides a function for performing capture of an image of the object, without consideration of the position of the capturing area in the panel component.

Besides, the user can obtain a service into which a content browsing service and a service that provides capture of an image of a document and/or the like are integrated, and the user can perform the operation for content browsing and the operation for capturing an image of a document and/or the like through use of the same window. This yields the effect of improving convenience and operability of the user.

Yet further, in the above arrangement, an apparatus for displaying an image and sensing an object image according to the present invention may further comprises: source code obtaining means that obtains the source code from a first external device.

According to the above arrangement, it is possible to obtain the source code from the first external device.

Therefore, it is possible to cause the panel component to capture the image of the object that is placed on the placement area having been shown according to the source code obtained from the first external device.

This yields the effect of allowing the provider of the content to provide content containing a function for performing the capture, through the server device, which is the first external device.

That is, the provider of the content can provide the content containing the function for performing the capture, through an external server device, thus realizing construction of the content as an SaaS application.

Further, in the above arrangement, an apparatus for displaying an image and sensing an object image according to the present invention is such that the image deriving means derives the captured image by causing the entire panel component to capture the object image located in the vicinity of the panel component and extracting the area defined by the second area information from a captured object image.

According to the above arrangement, it is possible to derive the captured image by extracting the area defined by the second area information from an image of the object located in the vicinity of the panel component and captured by the entire panel component.

Therefore, it is possible to extract the image in the placement area, which image contains the image of the object, from the image captured by the entire panel component. That is, it is possible to remove a part corresponding to an area outside the placement area, from the image captured the entire panel component.

This yields the effect of enabling deriving of the captured image that reliably contains the image of the object placed on the placement area but does not contain the image corresponding to an area outside the placement area.

Still further, in the above arrangement, an apparatus for displaying an image and sensing an object image according to the present invention may be such that the image deriving means derives, as the captured image, the image of the object located in the vicinity of the panel component and having been captured by the panel component through the area defined by the second area information.

According to the above arrangement, it is possible to derive, as the captured image, the image of the object located in the vicinity of the panel component and having been captured by the panel component through the area defined by the second area information.

Therefore, it is possible to derive, as the captured image, the image of the placement area, which image contains the image of the object, through the panel component.

This yields the effect of enabling deriving of the captured image that reliably contains the image of the object placed on the placement area but does not contain the image corresponding to an area outside the placement area.

Yet further, in the above arrangement, an apparatus for displaying an image and sensing an object image according to the present invention may further comprise: image storing means that stores the captured image having been obtained by the image deriving means in a storage section of the apparatus.

According to the above arrangement, it is possible to store the captured image in the storage section of the apparatus for displaying an image and sensing an object image.

Therefore, it is possible to store the image in the placement area, which image contains the image of the object, in the storage section of the apparatus for displaying an image and sensing an object image.

This yields the effect of enabling the image of the object captured by the panel component to be subjected to various kinds of processes, such as an image analyzing process and an external transfer process.

Further, in the above arrangement, an apparatus for displaying an image and sensing an object image according to the present invention may further comprise: image transmitting means that transmits the captured image having been obtained by the image deriving means to the second external device.

According to the above arrangement, it is possible to transmit the captured image to the second external device.

Therefore, it is possible to transmit the image in the placement area, which image contains the image of the object, to the second external device.

This yields the effect that the server device, which is the second external device, can subject the image of the object captured by the panel component to various kinds of processes, such as an image analyzing process.

For example, the server device can perform the following processes: a process of subjecting an image of a name card captured by the panel component to character recognition so as to recognize characters included in the image of the name card, such as a name, an address, and an e-mail address; and a process of registering data of the recognized characters into the address list table.

The above apparatus for displaying an image and sensing an object image may be realized by a computer. In this case, the present invention encompasses: a program for controlling the apparatus for displaying an image and sensing an object image that causes a computer to operate as the foregoing means so that the apparatus for displaying an image and sensing an object image is realized by the computer; and computer-readable storage medium storing the program.

Finally, the main control section 800, the data processing section 700, and the circuit control section 600 of the data display/sensor apparatus 100 may be constituted by hardware logic or may be realized by software by means of a CPU (central processing unit) as shown below.

That is, the data display/sensor apparatus 100 includes a CPU that executes the order of a control program for realizing the aforesaid functions, ROM (read only memory) that stores the control program, RAM (random access memory) that develops the control program in executable form, and a storage device (storage medium), such as memory, that stores the control program and various types of data therein. The object of the present invention is realized by a predetermined storage medium. The storage medium stores, in computer-readable manner, program codes (executable code program, intermediate code program, and source program) of the control program of the data display/sensor apparatus 100, which is software for realizing the aforesaid functions. The storage medium is provided to the data display/sensor apparatus 100. With this arrangement, the data display/sensor apparatus 100 (alternatively, CPU or MPU) as a computer reads out and executes program code stored in the storage medium provided.

The storage medium may be tape based, such as a magnetic tape or cassette tape; disc based, such as a magnetic disk including a floppy® disc and hard disk and optical disk including CD-ROM, MO, MD, DVD, and CD-R; card based, such as an IC card (including a memory card) and an optical card; or a semiconductor memory, such as a mask ROM, EPROM, EEPROM, and a flash ROM.

Further, the data display/sensor apparatus 100 may be arranged so as to be connectable to a communications network so that the program code is supplied to the data display/sensor apparatus 100 through the communications network. The communications network is not to be particularly limited. Examples of the communications network include the Internet, intranet, extranet, LAN, ISDN, VAN, CATV communications network, virtual private network, telephone network, mobile communications network, and satellite communications network. Further, a transmission medium that constitutes the communications network is not particularly limited. Examples of the transmission medium include (i) wired lines such as IEEE 1394, USB, power-line carrier, cable TV lines, telephone lines, and ADSL lines and (ii) wireless connections such as IrDA and remote control using infrared light, Bluetooth®, 802.11, HDR, mobile phone network, satellite connections, and terrestrial digital network. Note that the present invention can be also realized by the program codes in the form of a computer data signal embedded in a carrier wave which is embodied by electronic transmission.

The present invention is not limited to the aforementioned embodiments and is susceptible of various changes within the scope of the accompanying claims. Also, an embodiment obtained by suitable combinations of technical means disclosed in the different embodiments are also included within the technical scope of the present invention.

Specific embodiments or examples implemented in the description of the embodiments only show technical features of the present invention and are not intended to limit the scope of the invention. Variations can be effected within the spirit of the present invention and the scope of the following claims.

Industrial Applicability

The present invention is applicable to a device that performs a process of displaying an image and the like and a process of capturing an image of an object. Particularly, the present invention is applicable to a PC capable of displaying a Web page through a browser.

Reference Signs List

11 Browser processing section (window display control means, source code obtaining means, image transmitting means)
12 API processing section (coordinates converting means)
13 Display API processing section
14 Capture API processing section
15 Driver processing section (image deriving means, image storing means)
16 Display driver processing section
17 Capture driver processing section
24 Captured image storage section (storage section)
100 Data display/sensor apparatus (apparatus for displaying an image and sensing an object image)
300 Display/optical sensor section
301 Sensor-equipped liquid crystal panel (panel component)

700 Data processing section
800 Main control section
1000 External server (first external device, second external device)
C Name card (object)
H Source (source code)
W Browser (window)
CG Captured image
CP Capturing page (content)
RA Placement area

The invention claimed is:

1. An apparatus for displaying an image and sensing an object image, the apparatus comprising a panel component that displays an image and captures an object image, the apparatus further comprising:
a window display control section that causes a window including a placement area to be displayed on the panel component, the placement area being an area for placing an object;
a coordinates converting section that converts first area information into second area information, the first area information indicating the location of the placement area in the window, the second area information indicating the location of the placement area in the panel component;
the panel component captures an image of an object located in the vicinity of the panel component; and
an image deriving section that derives an image based on the captured image within an area defined by the second area information, wherein
the first area information is contained in source code, the source code defining content that is shown in the window and contains the placement area, and the window display control section causes the window to be displayed on the panel component, according to the source code, in such a state where the content containing the placement area is located in the window.

2. The apparatus according to claim 1, further comprising:
a source code obtaining section that obtains the source code from a first external device.

3. The apparatus according to claim 2, wherein
the image deriving section derives the captured image by causing the entire panel component to capture the object image located in the vicinity of the panel component and extracting the area defined by the second area information from a captured object image.

4. The apparatus according to claim 2, wherein
the image deriving section derives, as the captured image, the image of the object located in the vicinity of the panel component and having been captured by the panel component through the area defined by the second area information.

5. The apparatus according to claim 1, wherein
the image deriving section derives the captured image by causing the entire panel component to capture the object image located in the vicinity of the panel component and extracting the area defined by the second area information from a captured object image.

6. The apparatus according to claim 1, wherein
the image deriving section derives, as the captured image, the image of the object located in the vicinity of the panel component and having been captured by the panel component through the area defined by the second area information.

7. The apparatus according to claim 1, further comprising:
an image storing section that stores the captured image having been derived by the image deriving section in a storage section of the apparatus.

8. The apparatus according to claim 1, further comprising:
an image transmitting section that transmits the captured image having been derived by the image deriving section to the second external device.

9. A non-transitory computer readable medium storing a control program which when executed by a computer included in an apparatus for displaying an image and sensing an object image, causes the computer to function as the sections according to claim 1.

10. A method for controlling an apparatus for displaying an image and sensing an object image, the apparatus comprising a panel component that displays an image and captures an object image located in the vicinity of the panel component, the method comprising:
causing a window including a placement area to be displayed on the panel component, the placement area being an area for placing an object;
converting first area information into second area information, the first area information indicating the location of the placement area in the window, the second area information indicating the location of the placement area in the panel component;
capturing an image of an object located in the vicinity of the panel component; and
deriving an image based on the captured image within an area defined by the second area information, wherein
the first area information is contained in source code, the source code defining content that is shown in the window and contains the placement area, and the window is caused to be displayed on the panel component, according to the source code, in such a state where the content containing the placement area is located in the window.

* * * * *